United States Patent
Chen et al.

(10) Patent No.: US 11,468,063 B2
(45) Date of Patent: *Oct. 11, 2022

(54) AGGREGATION OPERATOR OPTIMIZATION DURING QUERY RUNTIME

(71) Applicant: Snowflake Inc., Bozeman, MT (US)

(72) Inventors: Bowei Chen, San Bruno, CA (US); Thierry Cruanes, San Mateo, CA (US); Florian Andreas Funke, San Mateo, CA (US); Allison Waingold Lee, San Carlos, CA (US); Jiaqi Yan, San Mateo, CA (US)

(73) Assignee: Snowflake Inc., Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/232,821

(22) Filed: Apr. 16, 2021

(65) Prior Publication Data

US 2021/0232583 A1  Jul. 29, 2021

Related U.S. Application Data

(63) Continuation of application No. 16/857,817, filed on Apr. 24, 2020, now Pat. No. 11,144,550.

(Continued)

(51) Int. Cl.
*G06F 16/2453* (2019.01)
*G06F 16/2455* (2019.01)
*G06F 16/22* (2019.01)

(52) U.S. Cl.
CPC .... *G06F 16/24542* (2019.01); *G06F 16/2255* (2019.01); *G06F 16/2456* (2019.01);
(Continued)

(58) Field of Classification Search
CPC ......... G06F 16/24542; G06F 16/24537; G06F 16/24545; G06F 16/24556; G06F 16/2255; G06F 16/24544; G06F 16/2456
See application file for complete search history.

(56) References Cited

U.S. PATENT DOCUMENTS 7,822,712 B1  10/2010  Robinson et al.
7,908,242 B1   3/2011  Achanta
(Continued)

FOREIGN PATENT DOCUMENTS

CN     113711197 A     11/2021
WO  WO-2021/061276 A1   4/2021
WO  WO-2022026975 A1    2/2022

OTHER PUBLICATIONS

Salesforce Stack Exchange, Inconsistency with error "Aggregate query has too many rows for direct assignment", May 4, 2017, https://salesforce.stackexchange.com/questions/172871/inconsistency-with-error-aggregate-query-has-too-many-rows-for-direct-assignmen (Year: 2017) (Year: 2017).*

(Continued)

*Primary Examiner* — Allen S Lin
(74) *Attorney, Agent, or Firm* — Schwegman Lundberg & Woessner, P.A.

(57) ABSTRACT

The subject technology provides information, corresponding to properties of a build side of a join operation, to a bloom filter. The subject technology, based at least in part on the information from the bloom filter, determines, during executing of a query plan, at least one property of the join operation to determine whether to switch an aggregation operator to a pass through mode, the at least one property comprising at least a reduction rate. The subject technology, switches, in response to the reduction rate being below a threshold value, the aggregation operator to the pass through mode during runtime of the query plan and, while the aggregation operator is in the pass through mode, an input stream of data goes through the aggregation operator without being analyzed and the input stream of data matches an output stream of data flowing out of the aggregation operator.

11 Claims, 19 Drawing Sheets

Related U.S. Application Data

(60) Provisional application No. 62/905,920, filed on Sep. 25, 2019.

(52) U.S. Cl.
CPC .. *G06F 16/24537* (2019.01); *G06F 16/24544* (2019.01); *G06F 16/24545* (2019.01); *G06F 16/24556* (2019.01)

(56) References Cited

U.S. PATENT DOCUMENTS

| | | | |
|---|---|---|---|
| 10,997,173 | B2 | 5/2021 | Chen et al. |
| 11,144,550 | B2 | 10/2021 | Chen et al. |
| 2004/0111410 | A1 | 6/2004 | Burgoon et al. |
| 2005/0222965 | A1 | 10/2005 | Chaudhuri et al. |
| 2005/0240577 | A1 | 10/2005 | Larson et al. |
| 2009/0019005 | A1 | 1/2009 | Hu et al. |
| 2009/0106198 | A1 | 4/2009 | Srinivasan et al. |
| 2010/0162251 | A1 | 6/2010 | Richards et al. |
| 2010/0235332 | A1* | 9/2010 | Haustein ............... G06F 16/221 707/692 |
| 2011/0191305 | A1* | 8/2011 | Nakamura ............ G06F 3/0641 707/692 |
| 2012/0173515 | A1 | 7/2012 | Jeong et al. |
| 2013/0166576 | A1* | 6/2013 | Hudzia ............... G06F 16/2255 707/754 |
| 2014/0156636 | A1 | 6/2014 | Bellamkonda et al. |
| 2014/0201222 | A1 | 7/2014 | C. N. et al. |
| 2015/0220573 | A1* | 8/2015 | Attaluri ................. G06F 16/215 707/690 |
| 2015/0248461 | A1 | 9/2015 | Theeten et al. |
| 2015/0278295 | A1 | 10/2015 | Merriman et al. |
| 2015/0278306 | A1 | 10/2015 | Cheng |
| 2016/0034696 | A1 | 2/2016 | Jooste et al. |
| 2016/0350347 | A1* | 12/2016 | Das ....................... G06F 12/023 |
| 2016/0371330 | A1 | 12/2016 | Weyerhaeuser et al. |
| 2016/0378824 | A1* | 12/2016 | Li ..................... G06F 16/24532 707/715 |
| 2017/0099231 | A1* | 4/2017 | Li ........................... H04L 47/30 |
| 2018/0341728 | A1* | 11/2018 | Micou ..................... G06F 9/541 |
| 2019/0121676 | A1 | 4/2019 | Barinov |
| 2021/0089533 | A1 | 3/2021 | Chen et al. |
| 2021/0089535 | A1 | 3/2021 | Chen |
| 2021/0173839 | A1 | 6/2021 | Chen et al. |
| 2021/0263929 | A1 | 8/2021 | Chen et al. |

OTHER PUBLICATIONS

"Aggregate query has too many rows for direct assignment", Salesforce Stack Exchange, Inconsistency with error, [Online]. Retrieved from the Internet: <URL: https://salesforce.stackexchange.com/questions/172871, (May 4, 2017), 5 pgs.

"U.S. Appl. No. 16/283,431, Preliminary Amendment filed Jan. 28, 2020", 15 pgs.

"U.S. Appl. No. 16/857,790, Examiner Interview Summary dated Aug. 25, 2020", 3 pgs.

"U.S. Appl. No. 16/857,790, Final Office Action dated Dec. 18, 2020", 13 pgs.

"U.S. Appl. No. 16/857,790, Non Final Office Action dated Jun. 11, 2020", 18 pgs.

"U.S. Appl. No. 16/857,790, Notice of Allowance dated Mar. 9, 2021", 11 pgs.

"U.S. Appl. No. 16/857,790, Response filed Feb. 18, 2021 to Final Office Action dated Dec. 18, 2020", 9 pgs.

"U.S. Appl. No. 16/857,790, Response filed Sep. 10, 2020 to Non Final Office Action dated Jun. 11, 2020", 13 pgs.

"U.S. Appl. No. 16/857,817, Examiner Interview Summary dated Sep. 14, 2020", 3 pgs.

"U.S. Appl. No. 16/857,817, Examiner Interview Summary dated Dec. 1, 2020", 2 pgs.

"U.S. Appl. No. 16/857,817, Final Office Action dated Oct. 8, 2020", 17 pgs.

"U.S. Appl. No. 16/857,817, Non Final Office Action dated Jun. 16, 2020", 14 pgs.

"U.S. Appl. No. 16/857,817, Notice of Allowability dated Feb. 5, 2021", 3 pgs.

"U.S. Appl. No. 16/857,817, Notice of Allowance dated Jan. 19, 2021", 19 pgs.

"U.S. Appl. No. 16/857,817, Response filed Sep. 16, 2020 to Non Final Office Action dated Jun. 16, 2020", 13 pgs.

"U.S. Appl. No. 16/857,817, Response filed Dec. 4, 2020 to Final Office Action dated Oct. 8, 2020", 14 pgs.

"U.S. Appl. No. 16/939,750, Final Office Action dated Dec. 22, 2020", 18 pgs.

"U.S. Appl. No. 16/939,750, Non Final Office Action dated Sep. 9, 2020", 17 pgs.

"U.S. Appl. No. 16/939,750, Response filed Mar. 22, 2021 to Final Office Action dated Dec. 22, 2020", 18 pgs.

"U.S. Appl. No. 16/939,750, Response filed Dec. 9, 2020 to Non Final Office Action dated Sep. 9, 2020", 16 pgs.

"International Application Serial No. PCT/US2020/044606, International Search Report dated Sep. 8, 2020", 2 pgs.

"International Application Serial No. PCT/US2020/044606, Written Opinion dated Sep. 8, 2020", 6 pgs.

"What is a pseudo column, Give some examples?", GeekInterview, [Online] Retrieved from the Internet: <URL: http://www.geekinterview.com/question_details/2504>, (Aug. 29, 2004), 11 pgs.

"U.S. Appl. No. 16/939,750, Non Final Office Action dated Jun. 28, 2021", 20 pgs.

"International Application Serial No. PCT/US2021/070801, International Search Report dated Jul. 29, 2021", 2 pgs.

"International Application Serial No. PCT/US2021/070801, Written Opinion dated Jul. 29, 2021", 6 pgs.

"U.S. Appl. No. 16/939,750, Final Office Action dated Oct. 15, 2021", 20 pgs.

"U.S. Appl. No. 16/939,750, Response filed Sep. 28, 2021 to Non Final Office Action dated Jun. 28, 2021", 17 pgs.

"Chinese Application Serial No. 202080007293.X, Notification to Make Rectification dated Sep. 27, 2021", w/o English Translation, 1 pg.

"U.S. Appl. No. 16/939,750, Non Final Office Action dated Apr. 6, 2022", 21 pgs.

"U.S. Appl. No. 16/939,750, Response filed Jan. 17, 2022 to Final Office Action dated Oct. 15, 2021", 20 pgs.

"Chinese Application Serial No. 202080007293.X, Voluntary Amendment filed Mar. 2, 2022", w/ English Claims, 13 pgs.

"International Application Serial No. PCT/US2020/044606, International Preliminary Report on Patentability dated Apr. 7, 2022", 8 pgs.

\* cited by examiner

AGGREGATION OPERATOR OPTIMIZATION DURING QUERY RUNTIME

PRIORITY CLAIM

This application is a continuation of, and hereby claims priority under 35 U.S.C. § 120 to U.S. Non-Provisional patent application Ser. No. 16/857,817, entitled "PIPELINE LEVEL OPTIMIZATION OF AGGREGATION OPERATORS IN A QUERY PLAN DURING RUNTIME," filed on Apr. 24, 2020, and claims the benefit of priority of U.S. Provisional patent Application No. 62/905,920, filed Sep. 25, 2019, each of which is hereby incorporated by reference herein in its entirety for all purposes.

TECHNICAL FIELD

The present disclosure relates to databases and, more particularly, to query-plan-enhancement and adaptive aggregation-evaluation techniques in database environments.

BACKGROUND

Databases are widely used for data storage and data access in computing applications. A goal of database implementation is to organize enormous amounts of information so that the information can be accessed, managed, and updated, as examples. In a database, data may be organized into rows, columns, and tables. As used herein, a database table is a collection of records (e.g., rows). Each record contains a collection of values of table attributes (e.g., columns). Database tables are typically physically stored in multiple smaller (varying size or fixed size) storage units, e.g., files or blocks. Such files or blocks are referred to herein at times as micro-partitions. In some implementations, micro-partitions are not updated in-place, but rather new micro-partitions are generated and stored to reflect changes to database data.

Database-storage systems can be used for storing different types of content, such as bibliographic content, full-text content, numeric content, alphanumeric content, image content, video content, and/or the like. Further, database systems may be classified according to the organizational approach of the database. There are many different types of databases, including relational databases, distributed databases, cloud-based databases, object-oriented databases, and others.

Databases are often used by various entities (e.g., companies) for storing information that may need to be accessed and/or analyzed. In an example, a retail company may store a listing of sales transactions in a database. For a given transaction, the database may include information about when the transaction occurred, where the transaction occurred, a total cost of the transaction, an identifier and/or description of items that were purchased in the transaction, and/or the like. In the same database, the company may also store, as an example, employee information that might include employee names, employee contact information, employee work history, employee pay rate, and so forth. Depending on the needs of the company, the transaction-related information and the employee-related information may be stored in different tables of the database. The company may, from time to time, query its database to obtain information that is stored in the database.

The company may want to locate data about, for example, the names of all employees working at a certain store, all employees that were working on a certain date, all transactions that involved the purchase of a certain product during a certain time frame, and/or the like. When the company wants to query its database to extract certain organized information from the database, a query statement may be executed against the database. The query may return certain data according to one or more query predicates, which indicate what information should be returned by the query. The execution of the query may involve extracting specific data from the database and formatting the extracted data into a readable form. The query may be written in a language, such as Structured Query Language (SQL), that is understood by the database, so that the database can determine what data should be located and how it should be returned. The query may request any pertinent information that is stored within the database. If appropriate data can be found to respond to the query, the database has the potential to reveal complex trends and activities. This power can be harnessed through the use of a successfully executed query.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
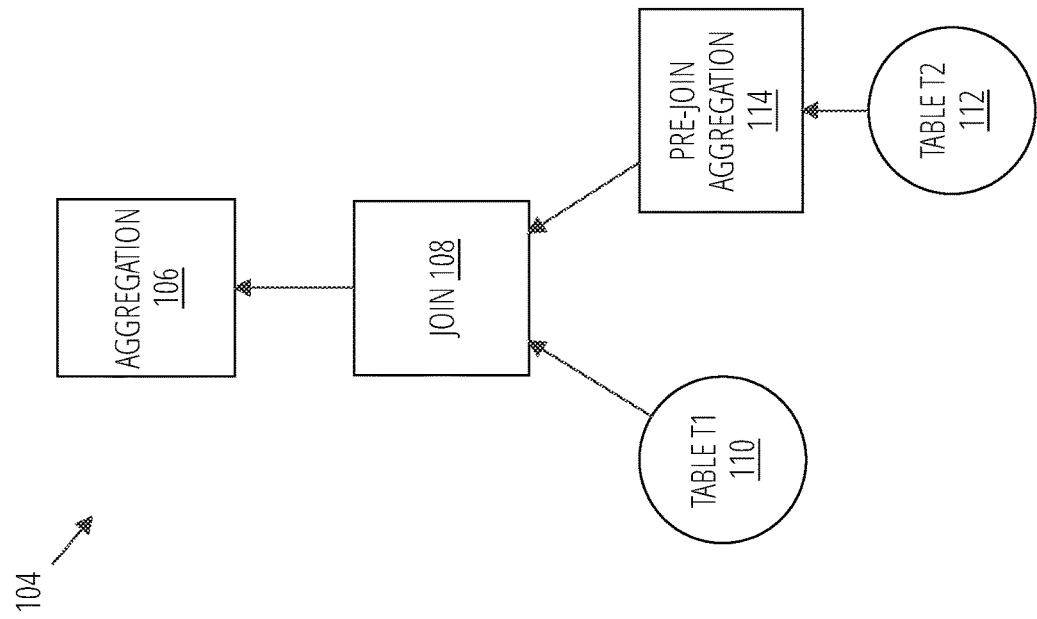
FIG. 1 illustrates an example aggregation placement, in accordance with at least one embodiment.
Figure 1:
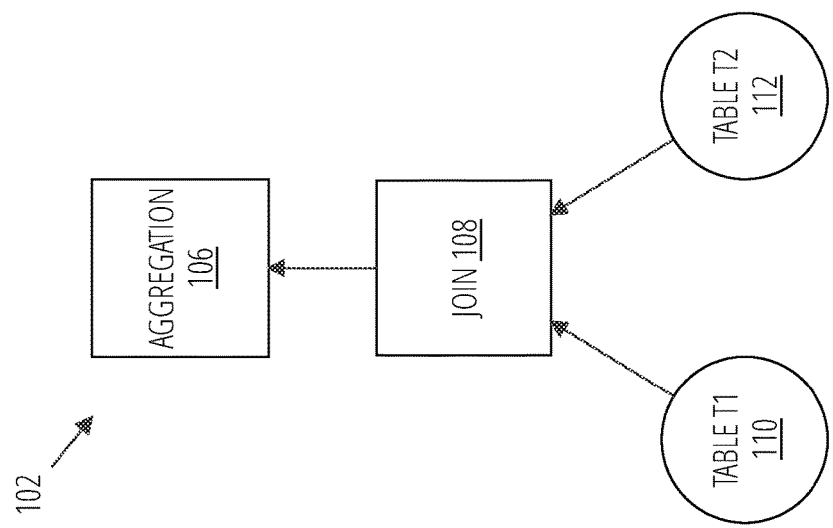

Some queries can be costly to execute in terms of, as examples, time, processing resources, and memory resources. Costly queries can tie up computing resources and slow down database operations. It is therefore desirable to enhance query plans and reduce the overall cost of query execution. In light of the foregoing, disclosed herein are systems and methods for adaptively enhancing query plans. Also disclosed herein are systems and methods for conditionally continuing execution of a portion of a query plan.

One example embodiment takes the form of a method for adaptively enhancing query plans. The method includes obtaining a query plan that corresponds to a query. The method also includes identifying one or more join-aggregation sequences in the query plan. Each identified join-aggregation sequence includes a join operator positioned below an aggregation operator. The method also includes generating a modified query plan at least in part by, for each identified join-aggregation sequence, determining whether the aggregation operator in the join-aggregation sequence is a duplicate-insensitive aggregation operator, and if so then inserting an adaptive duplicate-removal operator below at least one input of the corresponding join operator. The method also includes executing the modified query plan to obtain a query result. Executing the modified query plan includes, for each inserted adaptive duplicate-removal operator: initially operating with the inserted adaptive duplicate-removal operator active; monitoring at least one runtime cost-efficiency metric of at least one of the inserted adaptive duplicate-removal operator and the corresponding join operator; and deactivating the inserted adaptive duplicate-removal operator if the at least one monitored runtime cost-efficiency metric indicates a threshold-inefficiency condition.

Another example embodiment takes the form of a method of conditionally continuing execution of a portion of a query plan. The method includes executing a query plan that corresponds to a query. The query plan includes an aggregation operator positioned below a join operator. The method also includes, while executing the query plan: monitoring at least one runtime cost-efficiency metric of the executing query plan; and deactivating the aggregation operator based at least in part on the at least one monitored runtime cost-efficiency metric.

Another embodiment takes the form of a system that includes at least one processor, and that also includes one or more non-transitory computer readable storage media containing instructions executable by the at least one processor for causing the at least one processor to perform at least the operations that are listed in either or both of the preceding two paragraphs. Still another embodiment takes the form of one or more non-transitory computer readable storage media (CRM) containing instructions executable by the at least one processor for causing the at least one processor to perform at least the operations that are listed in either or both of the preceding two paragraphs.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment, a CRM embodiment, and/or one or more other types of embodiments. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

Adaptive Aggregation and Query Enhancement

Embodiments of the disclosure apply adaptive aggregation to query plans. In an embodiment, an adaptive aggregation operator is configured to remove duplicate values in a dataset. In at least one embodiment, the adaptive aggregation operator removes database records (e.g., rows) having duplicative values for particular attributes (e.g., aggregation keys of the adaptive aggregation operator). In at least some embodiments, the adaptive aggregation operator selectively and adaptively turns on and off during query execution based on information observed (by, e.g., the operator itself) at runtime, such observed information including the reduction rate of the aggregation operator, the selectivity of an associated join operator, the explosiveness of the associated join operator, and/or the like. In an embodiment, the adaptive aggregation operator is inserted in the query plan below either or both sides of one or more join operations. Embodiments of the systems and methods disclosed herein provide improved query plans that are cost-efficient and adapt at runtime to reduce overall query-execution cost.

It is noted that, in the present disclosure, with respect to a given query plan, "below" means "sequentially before," "scheduled to occur sequentially before," or the like, whereas "above" conversely means "sequentially after," "scheduled to occur sequentially after," or the like. Moreover, in this disclosure, the phrases "query plan" and "query execution plan" are used interchangeably. Furthermore, the terms "operator" and "operation" are used interchangeably as well. As an example, the terms "join operator" and "join operation" should be considered equivalent, and at times such an operator or operation is referred to simply as a "join." The terms "aggregation operator," "aggregation operation," and simply "aggregation" are similarly used interchangeably in the present disclosure. Those of skill in the relevant art are familiar with such minor variances in terminology.

In another embodiment, a method is disclosed for enhancing a query plan. The method includes defining a query plan for a query, where the query plan includes a join operation, which itself has a build side and a probe side. The method includes enhancing the query plan by inserting an aggregation operator below a probe side of the join operator in the query plan. The method further includes causing a build side of the join operator to (i) generate a bloom filter from the build-side hash table and (ii) provide the number of distinct values of the join key from the build side to the bloom filter. Since the bloom filter is placed below the inserted aggregation operator in the query plan, the inserted aggregation operator will be able to use the number of distinct values of the join key in conjunction with the selectivity of the bloom filter to estimate properties (e.g., the join cardinality) of the join operator. Based, in some embodiments, at least in part on a locally observed reduction rate, the aggregation operator can adaptively switch to a passthrough mode to avoid incurring additional overhead.

In an embodiment, aggressive adaptive aggregation is implemented to insert adaptive aggregation operators in every node location of a query plan for which doing so would preserve the semantic equivalence of the query. Such an inserted aggregation operator can be adapted (e.g., selectively switched on and off) during execution of the query. In an embodiment, at least one inserted aggregation operator is not fully evaluated: partial evaluation is still beneficial. In an example, at least one inserted duplicate-removal aggregation operator is not fully evaluated—that is, it does not remove all possible duplicates within its purview. In at least one embodiment, inserted aggregation operations can be disabled and reenabled during execution of the query plan based on information observed at runtime.

In an embodiment, adaptive aggregation is implemented with try-deduplication placement. In the present disclosure, "try-deduplication placement" refers to a technique according to which an adaptive duplicate-removal (aggregation) operator is inserted below each permissible join-aggregation sequence in a query plan. Each join-aggregation sequence includes a join operator below (i.e., before) an aggregation operator, and, in at least one embodiment, each permissible join-aggregation sequence is a join-aggregation sequence for which the aggregation operator is duplicate-insensitive (a.k.a. duplicate-agnostic). Duplicate-insensitive aggregation operators are those for which duplicates in the subject data set do not affect the answer provided by the aggregation operator. Examples of duplicate-insensitive aggregation operators include finding the maximum value in a data set, finding the minimum value in a data set, counting the number of distinct values in a data set, and/or the like. Try-deduplication placement is additionally applicable in some instances to semi joins and anti joins. In the context of two-table joins, a semi-join is a join that returns one copy of each row in the first table for which at least one match is found in the second table, whereas an anti join returns one copy of each row in the first table for which no match is found in the second table.

Embodiments of the systems and methods described herein have several advantages. One advantage is the fact that initial query plans need not be perfect due to the presently disclosed runtime adaptations. Another advantage is the reduction in likelihood that query performance will regress as compared to execution of an initial query plan (that is, if adaptive aggregation pursuant to the present disclosure were not enabled). Therefore, in at least one embodiment, the systems and methods disclosed herein yield strictly improved query performance. Another advantage is that placing aggregation operators in multiple locations throughout a query execution plan potentially yields more performance improvements as compared with placing an aggregation operator only in one location.

Various embodiments involve both join operators and aggregation operators. These are discussed in turn below by way of further introduction.

Join Operators

A join is an operation in query processing that includes identifying rows in two input streams that match with respect to at least some of their attributes, which are referred to as join keys. Join operations are typically (or at least can be) very time-consuming operations during query execution. A known embodiment of a join operation includes a SQL join clause for combining columns from one or more (e.g., two) tables in a relational database. The join clause is a means for combining columns from one or more tables by using values common to each of the one or more tables.

A hash join is an example of a join operation that may be used in the implementation of a relational database management system (RDBMS). Various forms of hash joins are commonly used in database systems to compute the result of a join. Hash joins build one or more hash tables with rows of one of the inputs (typically the smaller input) referred to as the "build side" input. The rows are probed from the other input (typically the larger input) referred to as the "probe side" input and into the hash tables. In massively parallel database systems with N servers, two distribution strategies are often distinguished: broadcast joins and hash-hash joins (the latter of which are also often referred to as shuffle joins). These two distribution strategies are described below.

A broadcast join is an example of a join operation in which a single side of the data to be joined is sent to each of a plurality of servers (or other workers (e.g., processors, threads, and/or the like)). Broadcast joins are efficient when the build-side input fits into a main memory of a single such server. Broadcast joins distribute all rows of the build-side input to all (N) servers and then hash-partition the probe-side input over the N servers such that each of the N servers receives only a fraction of the probe-side input. Each of the N servers probes its partition of the probe-side input into its copy of the hash table, which, as stated includes all of the data from the build-side input.

Hash-hash joins are often employed where the build-side input does not fit into a main memory of a single server. Hash-hash joins are configured to hash-partition the build-side input across all N servers and then hash-partition the probe-side input with the same partitioning function. In a hash-hash join, each server of the N servers probes its partition of the probe-side input into its partition of the build-side input. The partitioning function ensures that, if a row from an ith probe partition $PP_i$ has matches in the build side, those matches are in build partition $BP_i$, both of which would be assigned to the same server i. This approach leads to equal utilization of all N participating servers during the probe phase of the hash-hash join if and only if the partitioning function partitions the probe-side input into N partitions of equal size. In particular, if one server receives a disproportionately large amount of probe-side data, that server will take much longer than the rest of the servers to process its share of the probe-side input. This can stall the rest of the query execution. This is often caused by a few frequently occurring join keys on the probe side, such that some rows of the build-side input match many rows of the probe-side input. This is referred to as probe-side skew.

Query-optimization techniques disclosed herein can be applied to queries that include any of the above-referenced join operations. In an embodiment, an aggregation operator is inserted into a query plan below a join operation to remove duplicate values in a dataset before the join operation is performed. This can reduce the overall cost of query execution in terms of time, processing resources, and memory resources.

Aggregation Operations

Aggregation operations can be an effective tool for providing useful metrics about database data, for enhancing query plans, and for improving database performance, among other benefits. Aggregation operations operate on values across rows to perform mathematical calculations such as counting distinct values in a data set, identifying minimum values, identifying maximum values, computing average values, values ranking, computing standard deviations, and estimation, as examples. Aggregation operations can also perform non-mathematical operations. In an example, an aggregation operation takes zero, one, or more rows as input and produces a single row for each group according to the grouping key. As mentioned herein, the phrase "grouping key" refers to a set of identifiers, discussed further below, for aggregating data in a given group. In contrast, scalar operations take one row as input and produce one row as output.

It is noted that the present disclosure includes examples of what are referred to herein at times as being aggregation operators, such as the adaptive aggregation(AT) operator, that do not produce a single output. In the case of the AT operator, the input is a stream of records and the output is also a stream of records. When deactivated (e.g., when set to operate in a passthrough mode in which records are not evaluated for potential duplication with other records), the input stream and output stream match. When active, the output stream differs from the input stream in cases in which the AT operator identifies and removes at least one duplicate record (e.g., a record that is a duplicate of another record at least with respect to a duplicate-removal key). In an example, this property (e.g., potentially producing multiple rows for the same group) applies to all adaptive aggregation operations and is not limited to adaptive aggregation operations as mentioned herein.

More generally, an aggregation operation has two parts, namely an aggregation key and an aggregation function. The aggregation key (e.g., grouping key) defines identifiers for certain data to be aggregated or selected. The aggregation function defines the mathematical or non-mathematical operation to be performed on data satisfying the aggregation key. In an example, an aggregation operation is performed to calculate a total number of products sold in the state of California in the months of April and May. In this example aggregation operation, the aggregation keys include the state of California, the month of April, and the month of May. The aggregation function in this example is the summation function.

Some aggregation functions ignore NULL values. For example, an aggregation function for averaging data may calculate the average of values based on a formula. For the averaging formula, only non-NULL values may be used in the numerator and denominator. If all values passed to the aggregation function are NULL, then the aggregation function may return NULL.

Aggregation operations have numerous properties that cause aggregations to be an important aspect of query optimization. Aggregation operations can have splitability, decomposability, and duplicate-sensitivity, as discussed further below.

Aggregation operations can have splitability (i.e., they can be split). A vector of aggregation operations can be split into two parts if each aggregation operation accesses only attributes from one of two mutually exclusive subsets of input attributes. For aggregation placement, aggregations can be pushed down (e.g., inserted) below a join for the subset of aggregation operations with attributes coming from only one side of the join. One of the two subsets can be empty, and this may mean that all aggregation operations can be pushed down to (e.g., inserted below) one side of the join.

It should be understood in the present disclosure that the verb "inserted" and the verb phrase "pushed down" and their equivalent forms in other tenses are used herein somewhat interchangeably. In instances in which a given aggregation operator was already present in a given query plan and then the position of that given aggregation operator vis-à-vis, e.g., a join operator is changed, the phrase "pushed down" or "pulled up" may be used to indicate changing the position of that aggregation operator to be lower or higher, respectively, in the query plan. In instances in which a given aggregation operator was not already present in a given query plan, the verb "inserted" may be used to indicate modifying (e.g., enhancing) the given query plan by placing the given aggregation operator into the query plan. However, in some instances, the verbiage of "pushing down" an aggregation operator "below a join" may be used to refer to such a modification—i.e., to refer to or describe inserting an aggregation operator into a query plan in which the given aggregation operator was not already present. Those of skill in the art are familiar with such use of language in this context.

At least some aggregation operations have decomposability. An aggregation operation "agg" is decomposable if there exists aggregation operations "agg1" and "agg2" such that agg(Z)=agg2(agg1(X), agg1(Y)) for sets of values X, Y, and Z where Z is equal to X∪Y. Within an aggregation-evaluation framework, it may be implied that an aggregation operation is decomposable if the aggregation operation has a child-and-parent aggregation implementation.

Aggregation operations have duplicate-sensitivity: they can be duplicate-insensitive or duplicate-sensitive. Duplicate-insensitive (a.k.a. duplicate-agnostic) aggregation operations are operations in which the results do not depend on whether there are duplicate values in the argument. Duplicate-sensitive aggregation operations are operations in which the results are sensitive to whether there are duplicate values in the argument. In some embodiments, duplicate-insensitive/sensitive properties impact how aggregations are handled and where or when the aggregation operations are inserted. For duplicate-insensitive aggregation operations, it can be semantically equivalent (and beneficial) for lower aggregations (i.e., those scheduled earlier in a given query plan) to remove at least some duplicates. For duplication-sensitive operations, it may be beneficial to determine the number of duplicates that are removed and maintain a separate count column for each group in the aggregation before the join. The duplicate-sensitive operation may take a per-group cardinality as an input when computing its own aggregations.

Broadly speaking, there are two general strategies of placing aggregations along a query plan: eager aggregation and lazy aggregation. Eager aggregation inserts pushes (e.g., inserts) aggregations below respective join operators. Lazy aggregation is the inverse transformation and pulls (e.g., inserts) aggregations above respective join operators. Eager application of aggregations can reduce processing time of a join. Thus, in an example, it is appreciated that eager aggregation is more beneficial if the join is explosive and aggregation is more reductive. In an example, lazy aggregation is more beneficial in the reverse scenario where the join itself is very selective and/or the aggregation is not very reductive. In an embodiment, an adaptive aggregation-modification scheme seeks to insert aggregations below joins and then adapt at runtime (based, e.g., on one or more monitored metrics as described herein). In some cases, aggregations may be pushed as far down multiple joins as possible (e.g., as semantically permissible) and to both sides (the build side and the probe side) of a join. The subject technology provides techniques that combine placing an aggregation operation above and below a join operator, and therefore advantageously enabling adapting during runtime (e.g., execution of the query plan).

Aggregation-Placement Enhancements to Query Plans

In some instances, it is beneficial to execute an aggregation operation at certain times during execution of a query. Therefore, it can be beneficial to insert (e.g., push) an aggregation operation at certain points within a query plan (e.g., query tree). Aggregation placement can be an important aspect of query enhancement, and is also referred to at times as "group-by placement." Aggregation placement can have a significant impact on the amount of time and computing resources required to fully execute a query. For example, by applying a given aggregation operation before executing a join operation, any subsequent join operations can be made less costly as a result of the execution of the given aggregation operation. This can yield benefits, for example, for query plans in which aggregation operations are originally above (i.e., scheduled to occur after) expensive joins and are instead placed below (i.e., scheduled to occur before) such joins. Semantic equivalence between a query plan with and without any placed aggregation operations is verified in various embodiments.

Aggregation placement is a query modification (e.g., enhancement) according to which one or more aggregation operations are placed at different positions in a query plan, which may include a join tree, as compared with the initial position of the one or more aggregation operations as specified in the SQL of the query. Aggregation-placement schemes include placing additional aggregation operations above or below the original aggregation in a join tree, or, in some cases, directly pulling or pushing the original aggregation operations through (e.g., above or below) joins. In an embodiment, if a join is exploding, it may be less costly to evaluate a given aggregation operation on an input to that join if the aggregation operation has a relatively low group count. Further, in an embodiment, if a given aggregation operation that is contained in a view or subquery is evaluated below a filtering join, the query execution may be less costly if the aggregation is pulled above—and therefore evaluated after—the join. In some embodiments, this optimization can yield orders of magnitude improvement (i.e., reduction) in query runtime.

Traditionally, aggregation-placement enhancements are performed by a cost-based query optimizer by costing—e.g., modeling, predicting, and/or estimating one or more costs of—plans with different aggregation-placement schemes and selecting the scheme deemed the best according to the cost model. There are numerous drawbacks to this approach. One drawback is that a query optimizer frequently makes mistakes and performs one or more unnecessary aggregations. The query becomes unnecessarily expensive if unnecessary aggregations are performed. This can lead to performance regressions as compared to the plan without applying the modification. Further, existing group-by aggregation placements are usually limited to a subset of simple aggregation functions and are only applied to inner joins.

Embodiments of the present disclosure address the aforementioned drawbacks of traditional methods, as well as other drawbacks of other methods. In an embodiment, aggregation is opportunistically applied in a query execution plan and is adapted during execution runtime. In various different embodiments, adaptive-aggregation enhancements are applicable to multiple types of aggregation functions. The implementation of adaptive aggregation is not specialized for a small subset of aggregation types and can be extended to existing aggregation frameworks to support aggregation placement. Additionally, embodiments of the present adaptive-aggregation enhancements apply to multiple join types including outer joins and semi joins.

In an embodiment, aggregation placement is performed to reduce the cost of executing a query. This may be accomplished by applying eager aggregation placement in the query plan when possible (e.g., when semantically permissible) and adapting during execution (based, e.g., on one or more monitored cost-efficiency metrics). In an embodiment, adaptive aggregation placement is performed such that lower aggregations can adapt to the input and stop early if not proving beneficial. In at least one embodiment, adaptive aggregation has low overhead because queries applying aggregation placement are not more expensive than queries that do not apply aggregation placement. In an embodiment, aggregation placement is applied to all join types including outer joins and semi joins.

In some embodiments, adaptive aggregation is available to all aggregation functions that satisfy certain properties. In an embodiment, adaptive aggregation is not limited to a subset of aggregations but can be integrated into an existing query optimization and aggregation framework.

In an embodiment, aggregation placements are implemented as rewrite rules in a query optimizer. In some embodiments, aggregations are always pushed down (e.g., inserted) below joins whenever that is a permissible (e.g., semantically permissible) transformation. A particular aggregation operation may be a top/bottom aggregation or an intermediate aggregation. An aggregation may be pushed down below multiple joins. When parallelizing the pushed-down aggregations, an intermediate aggregation operator may be created for the joins. In some embodiments, a query optimizer may create additional pseudocolumns to pass along intermediate aggregation results and additional required columns such as count expression produced by pushed-down aggregations.

As stated above, in some implementations, aggregation placements are implemented as rewrite rules in a query optimizer. In other embodiments, changes are made to an aggregation framework. In some embodiments, it is considered desirable to use rewrite rules in a query optimizer when possible to implement aggregation placement as disclosed herein.

In various embodiments, a query rewrite may happen in two phases: a pull-up phase and a push-down phase. The pull-up phase may propagate distinctness properties up the query tree and may eliminate unnecessary aggregations. The pull-up phase may consider the constraint properties and the existence of lower aggregations. In an embodiment, the upper aggregations are never fully eliminated in an adaptive-aggregation approach. The pull-up phase may occur before physical expansion of joins and group-bys. The push-down phase may occur after the physical expansion of joins, bloom filters, and aggregations. The push-down phase may first annotate plan nodes below aggregations with the distinct keys and expressions that could be eliminated.

In an embodiment, for an aggregation pushed below a join, eager aggregations are created and are evaluated locally in the same thread as the join. The benefits of aggregation pushdown may depend on properties of the join above. Eager aggregations may need to check for properties of the join when making execution-time decisions. Regardless of whether the eager aggregations are on the probe side or the build side of a join, the eager aggregations adapt locally in at least one embodiment.

In at least one embodiment, on the probe side of a join, eager aggregations can make further decisions because there is more visibility into the join results when the aggregations are in the same pipeline. On the probe side, the pushed-down aggregation may start in a passthrough mode. After the join above has processed a certain number of rows, the pushed-down aggregation may check for various properties of the join to determine whether it is beneficial for the aggregation to turn on. If not, the operator may remain in the passthrough mode for the duration of the query execution. If a query optimizer determines that it is beneficial to evaluate the aggregation, the query operator may buffer and evaluate the aggregation on a sample of rows to determine the selectivity of the aggregation. If the selectivity is low enough, the aggregation operator may stay on for the remainder of the query execution.

On the build side of a join, in some embodiments, it may not be possible to adapt to a given property (e.g., explosiveness) of a join. In some embodiments, optimizations may still be performed with local information on the build side. One such optimization can be performed for distinct pushdowns. The distinct-pushdown operation itself can be evaluated as part of a join build. In an embodiment, the distinct-pushdown operation includes maintaining a second-level hash table for each hash entry keyed by the additional distinct keys. Similarly, this can be used to evaluate duplicate-intensive aggregations such as identifying minimum values and identifying maximum values.

Other aspects of embodiments of the present disclosure are described below in connection with the drawings. That is, a detailed description of embodiments of the present disclosure is provided herein, including below in connection with the drawings. While several embodiments are described herein, including below, it should be understood that this disclosure is not limited to any one embodiment, but instead encompasses numerous alternatives, modifications, and equivalents. In addition, while numerous specific details are set forth in the present disclosure in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the present disclosure.

As a general matter, it is to be understood that this disclosure is not limited to the configurations, process steps, and materials disclosed herein, as such configurations, process steps, and materials may vary somewhat. It is also to be understood that the terminology employed herein is used for describing example implementations only and is not intended to be limiting.

Figure 2:
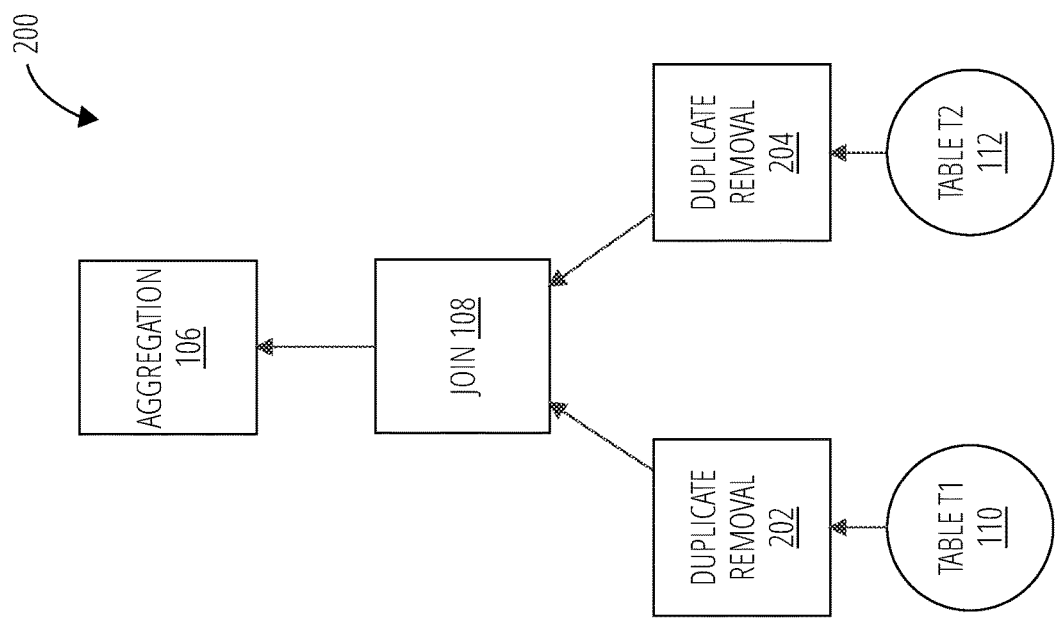
FIG. 2 illustrates an example enhanced query plan, in accordance with at least one embodiment.

Referring now to both FIG. 1 and FIG. 2, FIG. 1 illustrates an example aggregation placement 100, in accordance with at least one embodiment, while FIG. 2 illustrates an example enhanced query plan 200, in accordance with at least one embodiment. In particular, FIG. 1 depicts schematic diagrams of two potential query plans. On the left side of FIG. 1, there is depicted a query plan 102, while on the right side there is depicted an enhanced query plan 104. It is further noted that an enhanced query plan 200 is depicted in FIG. 2. Each of these three illustrated query plans includes a join 108 that is joining a first-side table T1 110 and a second-side table T2 112. The use of tables is for illustration; in other embodiments, one or both sides of a given join operation could take the form of or include an input stream of records or take another form. In the depicted embodiments, the enhanced query plan 104 and the enhanced query plan 200 provide significant cost savings in time, memory, and processing resources as compared with the query plan 102 when the join 108 is an explosive join. One example of an explosive join occurs when one side of the join has many more rows than the other side of the join. Another example of an explosive join occurs when the join is not very selective, and the result accordingly approaches a Cartesian product. An explosive join generates a large intermediate data set and is expensive to perform in terms of time, memory, and processing resources.

It is noted that, in the present disclosure, given that different types of joins exist, the depiction of a given join in a given way should not be taken as limiting. For example, a join that is not explicitly depicted as having a build side and a probe side could just as well be depicted that way. As examples, the join 108 of FIG. 1 and the combination of the join build 404 and join probe 406 of FIG. 4 could simply be different types of depictions of the same type of join operation, or they could be depicting different types of join operation.

In the enhanced query plan 104, an additional (as compared with the query plan 102) aggregation operation, namely a pre-join aggregation 114, is performed on one side of the join 108 before the join 108 is performed. Such an aggregation can be pushed to either or both sides of the join 108. In the example enhanced query plan 104 illustrated in FIG. 1, the pre-join aggregation 114 is performed on the second side (i.e., the right side) with respect to the table T2 112 before the join 108 is performed. In other embodiments, the aggregation may be performed on the first side or each of the first side and the second side before the join 108 is performed.

Many queries are similar to the query plan 102 and are expensive to compute. The enhanced query plan 104 can become more expensive than the query plan 102 if an additional aggregation function is performed as shown. It is therefore desirable to determine whether the query plan 102 or the enhanced query plan 104 is the most cost-efficient query plan for a certain query and a certain set of data. Embodiments of the present disclosure advantageously address this and other scenarios. In particular, embodiments of the present disclosure try the enhanced query plan 104, monitor how the execution is progressing, and essentially convert back to the query plan 102 if the enhanced query plan 104 does not turn out at runtime to benefit in terms of efficiency from the inclusion of the pre-join aggregation 114.

Traditional query optimizers calculate how to attempt to optimize a query based on cost. A traditional query optimizer may compare the query plan 102 and the enhanced query plan 104 to determine which is the least expensive to perform. Traditional query optimizers typically guess at this determination. Traditional query optimizers are known to frequently be incorrect when determining whether the query plan 102 or the enhanced query plan 104 is the most cost-efficient. The cost-based model that is frequently used in traditional systems has numerous drawbacks and frequently selects the incorrect query plan in terms of cost-efficiency. Prior implementations make such a choice and inflexibly stick with that choice; embodiments of the present disclosure adapt at runtime.

One query-optimization technique disclosed herein may be referred to as the duplicate-insensitive technique, and is also referred to as the try-deduplication placement. The duplicate-insensitive technique may be applied when an aggregation operation such as the aggregation 106 is duplicate-insensitive. The duplicate-insensitive technique may be cost-efficient. In an embodiment, the duplicate-insensitive technique includes inserting adaptive duplicate-removal aggregation operations into the query plan. In an embodiment, the duplicate-insensitive technique includes observing these inserted aggregation operations to determine whether the data (e.g., number of rows) is reduced sufficiently (e.g., more than a threshold) by each such aggregation operation. In some implementations, if the quantity of the data is not being sufficiently reduced, the aggregation operation turns off (e.g., deactivates, stops operating, and/or the like). In some embodiments, at least the monitoring and conditionaldeactivation aspects of the duplicate-insensitive technique can be performed locally by the inserted aggregation operation.

In some embodiments, the inserted aggregation operation observes the selectivity of the join 108. If the join 108 is very selective, then it may not be advantageous to begin the processing of the query with an aggregation operation such as the pre-join aggregation 114 in an active state, and the pre-join aggregation 114 may turn off. In an embodiment, the selectivity of the join 108 is determined by a bloom filter during the build phase of the join 108.

The enhanced query plan 104 and the enhanced query plan 200 may be performed when the query functions (e.g., the aggregation 106) are duplicate-insensitive. The enhanced query plan 200 includes pushing adaptive duplicate-removal operations 202 and 204 below both sides of the join 108. A duplicate-removal operation 202 or a duplicate-removal operation 204 may be pushed below the join on the first side (above table T1 110) and/or the second side (above table T2 112), respectively. In an embodiment, the duplicate-removal operators are pushed below the join 108 on both the first side and the second side of the join 108. In an embodiment, the duplicate-removal operation is pushed below the join 108 on only one of the first side and the second side of the join 108. In an embodiment, a given duplicate-removal operation scans the input otherwise bound for a given side of the join 108 and removes all or at least some duplicate values on the given side based on specific duplicate-removal keys provided to the duplicate-removal operation). The duplicate-removal operation can be performed before the join 108 to decrease the amount of processing, memory, and time required to perform the join 108. In an embodiment, the duplicate-removal operation is inserted in the query plan and pushed below the join 108 only when the aggregation 106 of the query is duplicate-insensitive. The enhanced query plan 200 represents an implementation of a duplicate-insensitive technique for query modification (e.g., enhancement) and adaptive aggregation.

An example implementation of the duplicate-insensitive technique is applied when a query requests minimum and/or maximum values for a table. In an example, a query is received that requests the greatest salary in a group of employees and the smallest salary in the group of employees. This query is duplicate-insensitive because the greatest and smallest salaries will be the same regardless of how many individuals have the same salary. In an example implementation, a join operation is used to perform this query, perhaps due to the structure and organization of the table(s). For example, different columns in the same table and/or different tables may be joined so that the entire listing of employees can be analyzed to identify the greatest and smallest salaries. In an example, a column from a first micro-partition (or other storage unit) is joined with a column in a second micro-partition. In an example, one of the two columns may be much larger than the other, meaning that the join operation is an explosive join. Because the join operation in that example is an explosive join, it may be advantageous to execute the query according to the enhanced query plan 104 by performing the pre-join aggregation 114 on at least one side of the join 108 before the join 108 is performed. This may reduce the input to the join 108 and thereby make the join 108 less expensive to execute. After the join 108 is performed, the aggregation 106 can be completed to identify the greatest and smallest salaries in the group of employees.

Figure 3:
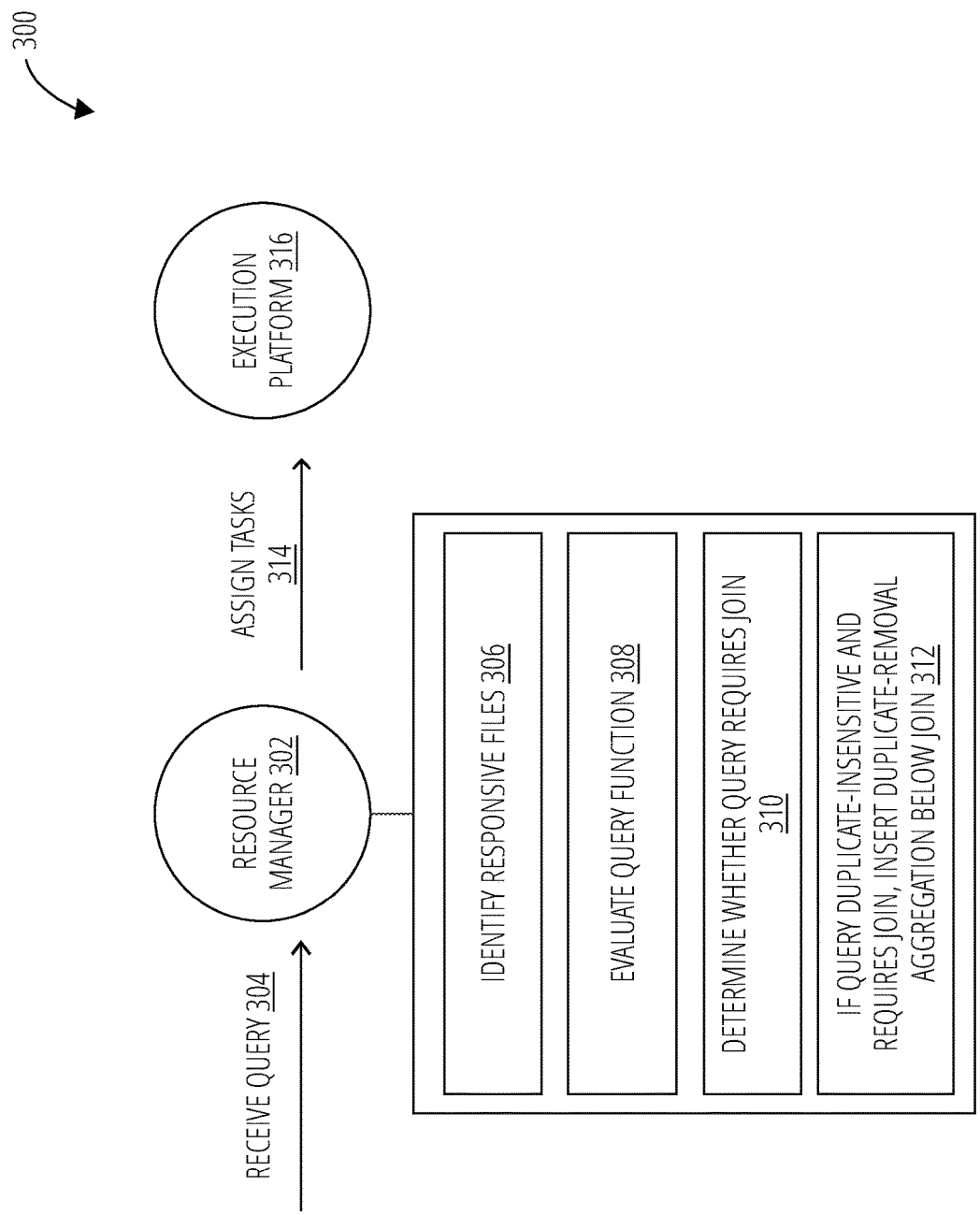
FIG. 3 illustrates an example process flow, in accordance with at least one embodiment.
Figure 5:
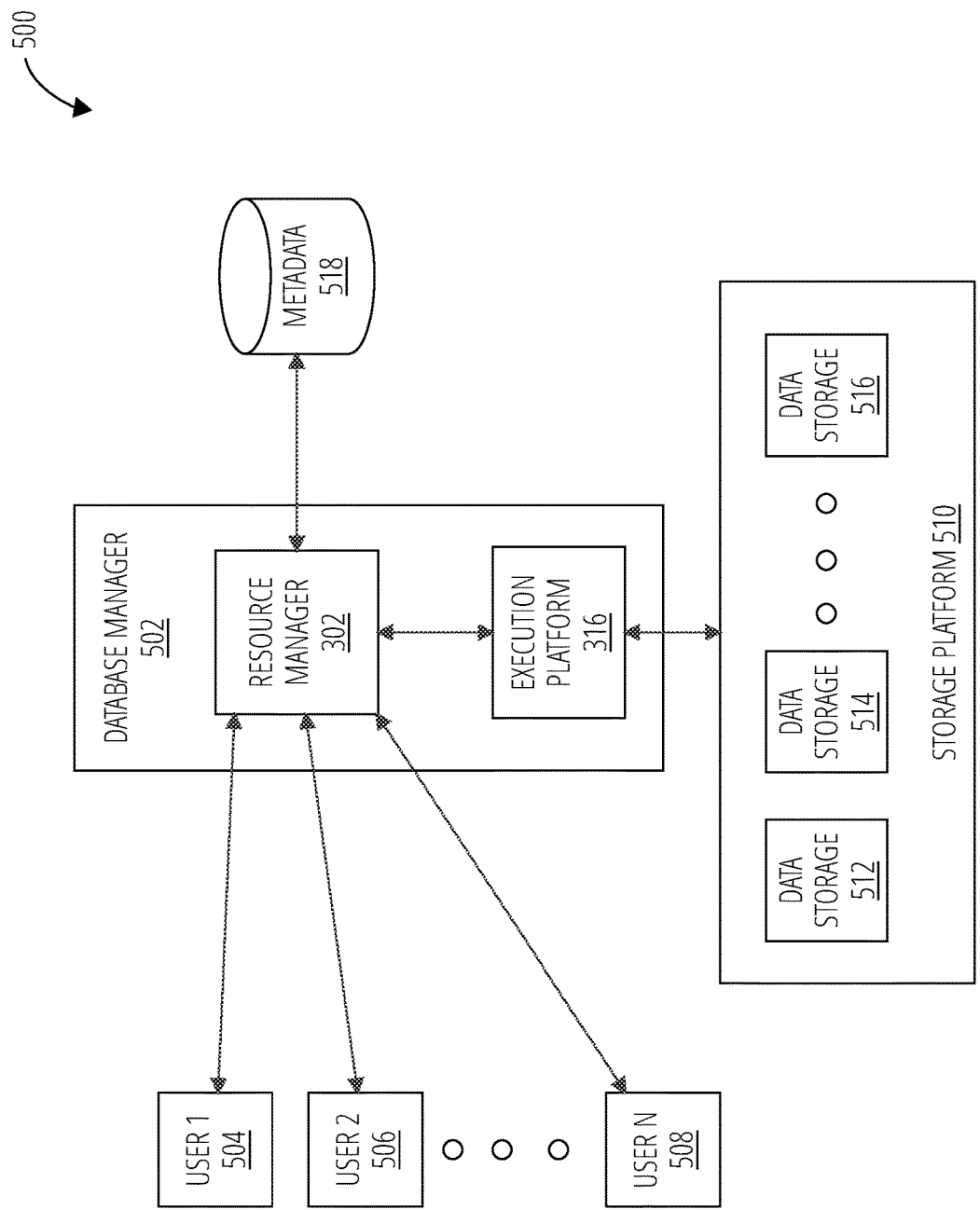
FIG. 5 illustrates an example data-processing platform, in accordance with at least one embodiment.
Figure 19:
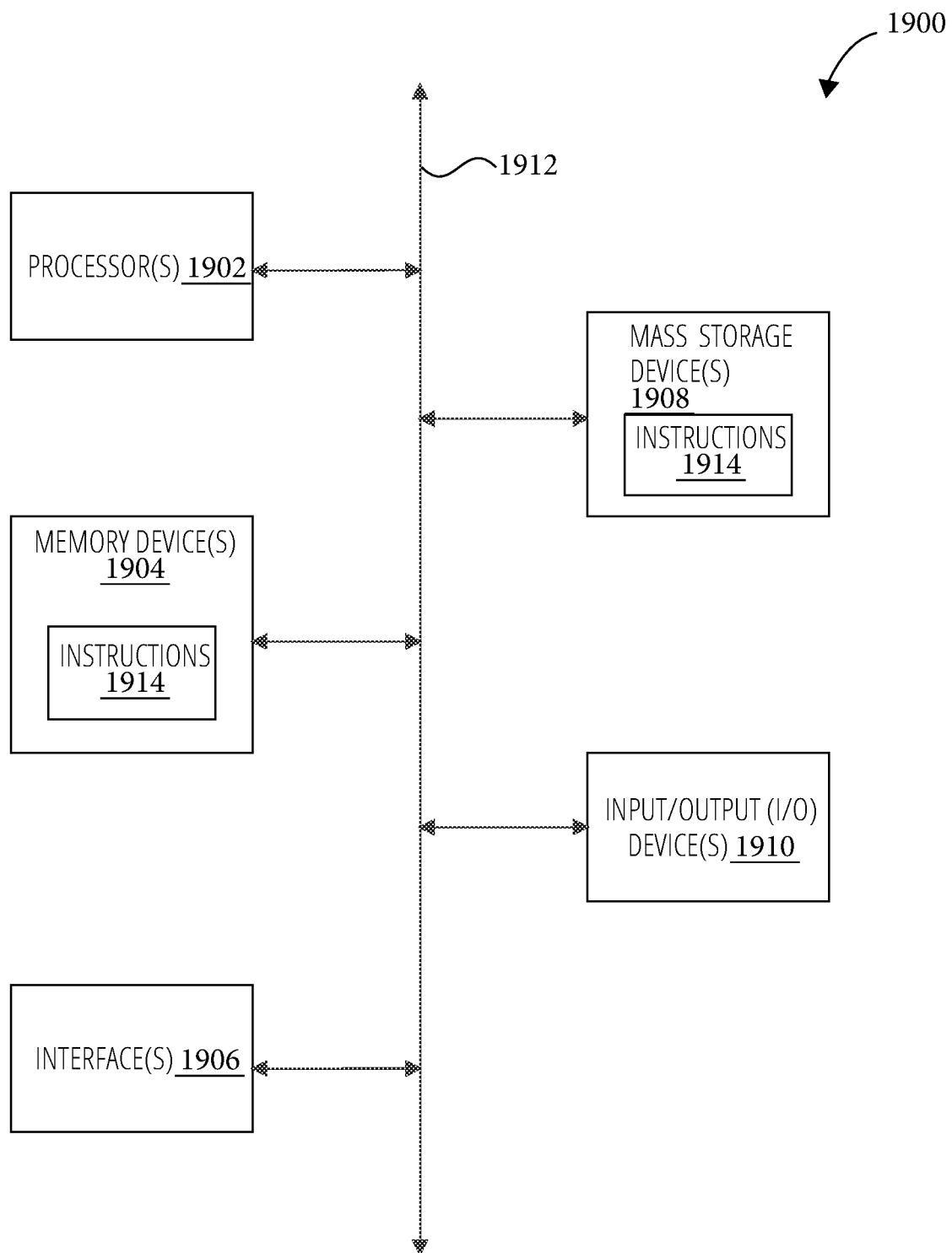
FIG. 19 illustrates an example computing device, in accordance with at least one embodiment.

FIG. 3 illustrates an example process flow 300 for modifying a query plan and assigning tasks for executing the modified query plan, in accordance with at least one embodiment. In at least one embodiment, the process flow 300 is performed by one or more entities of the data-processing platform 500 that is depicted in FIG. 5, which may execute on a computing device such as the example computing device 1900 that is depicted in FIG. 19.

In the process flow 300, a resource manager 302 receives a query at operation 304. The query may be received from a client account in communication with a database platform. The resource manager 302 identifies at operation 306 one or more files to be read to respond to the query. Each of the one or more files may be a micro-partition associated with a table. The resource manager 302 may identify the one or more files by scanning metadata in a metadata store, where the metadata store is independent of the database data in which the files are stored. The resource manager 302 may determine at operation 308 whether the one or more functions required for executing the query are duplicate-insensitive. In the depicted embodiment, the resource manager 302 determines at operation 310 whether execution of the query requires a join operation. The resource manager 302, in response to the query function(s) being duplicate-insensitive and the query plan including a join operation, inserts at operation 312 a duplicate-removal operation (e.g., an adaptive aggregation operator as described herein) in the query plan before the join operation to enhance (e.g., optimize) the query plan.

In an embodiment, the duplicate-removal operation is performed on at least one side of the join operation and removes all or most (or just some) duplicate values on that side (or both sides) of the join operation. A duplicate-removal operation may be inserted in the enhanced query plan below the join operation on both sides of the join operation. The duplicate-removal operation reduces the size of one or more inputs of the join and therefore causes the join to be more efficient in terms of time, processing, and memory resources. The modified query plan may then look similar to the enhanced query plan 104 illustrated in FIG. 1. If a duplicate-removal operation is inserted on both sides of the join operation, the modified query plan may then look similar to the enhanced query plan 200 illustrated in FIG. 2. The resource manager 302 may determine multiple tasks to be performed to execute the query and assign at operation 314 each of the multiple tasks to execution nodes of an execution platform 316, which may then execute the query according to the modified query plan.

An embodiment of the process flow 300 is performed in a best-effort manner. A given duplicate-removal operation may be performed in a best-effort manner such that some (e.g., most) but perhaps not all duplicate values are removed from the side of the query in which the duplicate-removal operation has been inserted. One goal of the query-enhancement techniques disclosed herein is to reduce the cost of executing a query by introducing additional tasks, such as one or more duplicate-removal operations, that do not increase the overall cost of executing the query. A given duplicate-removal operation may be performed such that a significant number of duplicate values are removed, and the subsequent join operation therefore costs less in processing, memory, and/or time. A given duplicate-removal operation might not be performed to completion, such that some duplicate values remain. This may not significantly increase the cost of performing the join. However, causing the duplicate-removal operation to perfectly remove all duplicate values could greatly increase the cost of the duplicate-removal operation and may further increase the overall cost of executing the query.

In an embodiment, a duplicate-removal operation (e.g., an adaptive aggregation operation) is performed by multiple execution nodes of an execution platform. Such execution nodes may also be referred to as workers, servers, threads, and/or the like. In such an embodiment, the multiple execution nodes may communicate with each other if they were to ensure that the duplicate-removal operation perfectly removes all duplicate values. This would be costly and undesirable in some implementations. Therefore, in an embodiment, the duplicate-removal operation is performed such that each of the multiple execution nodes removes the duplicate values in that execution node's portion of data. The multiple execution nodes need not communicate with each other to ensure that all duplicate values are removed across the multiple execution nodes. In such an embodiment, each of the multiple execution nodes may or may not perfectly remove all duplicate values in that execution node's portion of the data. However, the multiple execution nodes need not communicate with one another to ensure that all duplicate values are removed across all portions of the data. This is one embodiment of performing the duplicate-removal operation in a best-effort manner.

In an embodiment, the duplicate-removal operation is configured to remove duplicate values in an input stream constrained by an amount of memory allocated to the duplicate-removal operation. The duplicate-removal operation may begin by ingesting records (e.g., rows). The duplicate-removal operation may identify a reduction rate that may be defined as a ratio of (i) the number of records that the duplicate-removal operation has removed to (ii) the number of records that the duplicate-removal operation has ingested. In an embodiment, if the duplicate-removal operation is removing a smaller ratio of values than a predefined threshold, the duplicate-removal operation responsively turns off. For example, the duplicate-removal operation may determine that it has ingested one-thousand records and that all of those ingested records have been unique with respect to a particular key of the duplicate-removal operation. The duplicate-removal operation may be configured to then turn itself off because it is not removing a threshold rate of duplicate records. In another example, the duplicate-removal operation may determine that it has removed 90% of the records it has ingested, indicating that the data is highly duplicative. The duplicate-removal operation may then continue to run because it is removing a significant number of records, and the results of the duplicate-removal operation are likely to reduce the cost of performing the subsequent join operation.

In an embodiment, the duplicate-removal operation is configured to remove duplicate values in a best-effort manner. The duplicate-removal operation may be limited by an allocated amount of cache memory. The duplicate-removal operation may not be permitted to use more memory than that allocated and may therefore not be successful at removing all duplicate values. In such an embodiment, the duplicate-removal operation may ingest rows in a dataset and store a log of unique (e.g., as to one or more keys) rows in cache memory until the duplicate-removal operation has used all allocated cache memory. After the duplicate-removal operation has used all allocated cache memory, the duplicate-removal operation may remove from the log (in cache memory) those unique values that have not been seen frequently in the dataset. Because the duplicate-removal operation removes some unique values from the log after it has used its allocated cache memory, the duplicate-removal operation might not recognize all duplicates in the dataset. This is therefore an example of the duplicate-removal operation being configured to remove duplicate values in a best-effort manner, due in this case to memory constraints.

One query-modification technique disclosed herein may be referred to as the join-observation technique. In an embodiment, the join-observation technique includes observing a join probe when a given join operation is being performed. The join-observation technique may begin with an aggregation operation turned off. When the aggregation operation is turned off, the join probe may begin to execute the join operation. The join-observation technique may include determining whether query execution would be more cost-efficient if the aggregation operation is enabled. The aggregation operation may be configured to turn itself off when the data is not sufficiently reduced (e.g., by more than a threshold amount).

One query-optimization technique disclosed herein may be referred to as the adaptive-aggregation technique. In an embodiment, the adaptive-aggregation technique includes placing aggregation operations throughout a query plan. The aggregation operations may be placed on the build side and/or the probe side of one or more join operations. In an embodiment, an aggregation operation is placed on the build side of a join operation and is executed before the probe side of that join operation is executed. The adaptive-aggregation technique may include building a hash table with a number of distinct values. Aggregation may be performed and information may be passed to the build side along with bloom-filter activity. The aggregation operation may begin performing regular aggregation, and monitor the reduction rate. Based on the reduction rate, a property of the join operation may be determined. This information may be provided to the probe side of the join operation. In the adaptive-aggregation technique, the aggregation operation itself can shift between build side and probe side. The aggregation operation may have aggregation information readily available from the bloom filter and may decide without going to the probe side.

In at least one embodiment, the adaptive-aggregation technique is adaptive during runtime. In an embodiment, the aggregation operation makes decisions based on data from one or more bloom filters, and turns itself off when the aggregation operation determines that aggregation is not beneficial (e.g., with respect to time and/or resources needed to process the corresponding query). In an embodiment, the aggregation operation determines that the join is very selective (e.g., more than a selectivity threshold) and the aggregation itself is not reductive enough (e.g., a reduction rate is less than a threshold reduction rate). In an embodiment, the aggregation operation determines the explosiveness of the join and may further determine the explosiveness of the build side and the explosiveness of the probe side of the join. Based on any one or any combination of such cost-efficiency metrics, the aggregation operation may make a determination as to whether to be active or inactive (e.g., in a passthrough mode).

In an embodiment, adaptive aggregation and query modification is performed at runtime and therefore does not rely on a query optimizer to have devised an optimal query plan in the first instance. In such an embodiment, aggregation operations and/or duplicate-removal operations are placed throughout the query plan and are configured to automatically turn off in response to determining that their respective operation is not effective with that dataset (or dataset/query combination). This may increase the efficiency of the query and increase the likelihood that the query-modification techniques that are actually utilized and not deactivated are advantageous techniques for that dataset and that query. This is different from traditional query optimizers that are known to frequently select (and stick with) inefficient query-optimization techniques. In accordance with embodiments of the present disclosure, query-modification techniques are adaptive at runtime to increase the likelihood that the query is performed in a more efficient manner.

In an embodiment, a query-modification instance includes one or more of the duplicate-insensitive technique, the join-observation technique, and the adaptive-aggregation technique. Each and/or any combination of these techniques may be used in connection with processing a given query.

Figure 4:
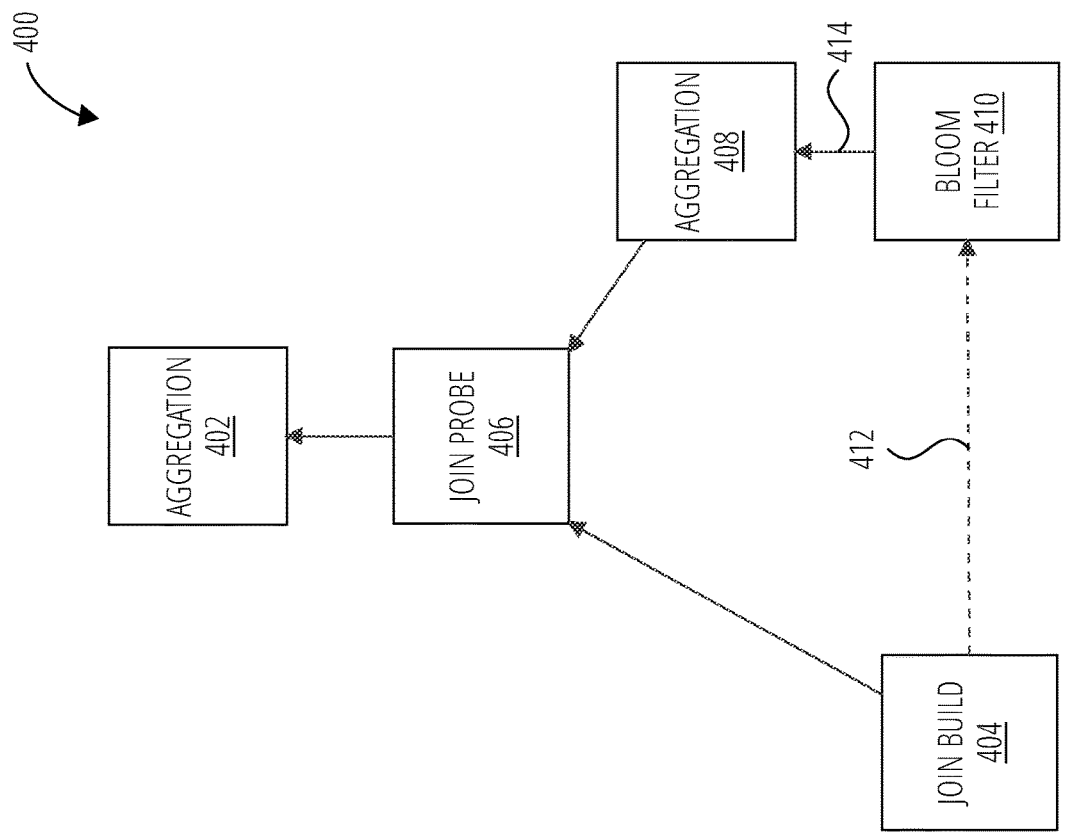
FIG. 4 illustrates an example enhanced query plan, in accordance with at least one embodiment.

FIG. 4 illustrates an example enhanced query plan 400, in accordance with at least one embodiment. In at least one embodiment, the enhanced query plan 400 may be implemented in an instance in which an aggregation 402 not duplicate-insensitive. An example of an aggregation operation that is not duplicate-insensitive is one that utilizes a count, sum, or other aggregation function, the final result of which is dependent on each value—including each instance of duplicate values—within the corresponding dataset. The enhanced query plan 400 includes a join operation. In an embodiment, the join operation is a hash join and includes a join build 404 and a join probe 406. In the enhanced query plan 400, an aggregation 408 is pushed down (e.g., inserted) below the join probe 406. In an embodiment, the aggregation 408 utilizes a bloom filter 410 to identify distinct values in the dataset and determine a reduction rate for the aggregation 408. The join build 404 may generate a hash table based on distinct values in the dataset.

In a hash join, a hash table may first be prepared on the smaller relation. The hash table may include the join key and its row. Because the hash table may be accessed by applying a hash function to the join key, it can be more efficient to find a given join key's rows by using the hash table than by scanning the original relation. After the hash table is built, the larger relation can then be scanned to find relevant (e.g., matching) rows in the smaller relation by referring to the hash table. The first phase is referred to as the join build 404 and the second phase is referred to as the join probe 406. The join relation on which the hash table is built may be referred as the build (or build-side) input and the other input may be referred to as the probe (or probe-side) input. The enhanced query plan 400 may be implemented with different join operations and is not necessarily implemented using a hash join.

In an example instance of executing the enhanced query plan 400, the join build 404 on the left side completes its operation before the aggregation 408 on the right side begins. The aggregation 408 then begins performing an aggregation based on an output 414 of the bloom filter 410, which receives information at information transfer 412 from the join build 404. The aggregation 408 may perform its particular aggregation function and monitor the reduction rate of its aggregation function based on the output 414 from the bloom filter 410. In an embodiment, the aggregation 408 is adaptive in that it is configured to turn itself off if its associated reduction rate does not meet a predefined threshold reduction rate and/or if the explosiveness of the join exceeds a predefined explosiveness threshold, as examples.

FIG. 5 illustrates an example data-processing platform 500, in accordance with at least one embodiment. In various embodiments, the data-processing platform 500 may be used for performing one or more of the operations of one or more of the methods (including processes and the like) disclosed herein. As shown in FIG. 5, the data-processing platform 500 includes a database manager 502, which itself includes the resource manager 302 and the execution platform 316, where the execution platform 316 may include one or more execution nodes (e.g., servers, workers, threads, and/or the like). The database manager 502 need not be a defined physical device, though it could be, but in general is used herein as shorthand to refer to the combination of the resource manager 302 and the execution platform 316.

The resource manager 302 may be configured to manage "external" database tasks—such as query requests—that are received from, e.g., a client account. The resource manager 302 may be coupled to any number N of multiple users such as a user 1 504, a user 2 506, and/or through a user N 508. In particular implementations, the resource manager 302 can support any number N of users desiring access to the data-processing platform 500. In at least one embodiment, the user 1 504, the user 2 506, through the user N 508 are not considered part of the data-processing platform 500, but rather they interact with the data-processing platform 500. The user 1 504, the user 2 506, and/or through the user N 508 may include, for example, end users providing data-storage and/or data-retrieval requests, system administrators managing the systems, methods, and devices described herein, and/or one or more other users, components, devices, and/or the like that interact with resource manager 302. The user 1 504, the user 2 506, and/or through the user N 508 may be referred to herein as (e.g., may include) clients, customers, and/or the like and may have a (e.g., direct) connection to one or more deployments as disclosed herein. Each of the user 1 504, the user 2 506, through the user N 508 may be connected to a primary deployment and have the capability to transition the connection from the primary deployment to a secondary deployment, as one example architecture.

The resource manager 302 may be coupled to a store of metadata 518, which in an embodiment is associated with the entirety of data stored throughout the data-processing platform 500. In some embodiments, the metadata 518 includes a summary of data stored in remote data-storage systems as well as data available from a local cache. Additionally, the metadata 518 may include information regarding how data is organized in remote data storage systems and in local caches. The metadata 518 may allow systems and services to determine whether a piece of data needs to be processed (e.g., in connection with a given query) without loading or accessing the actual data from a storage device.

The resource manager 302 may be further coupled to the execution platform 316, which may provide multiple computing resources that execute various data-storage and data-retrieval tasks. In an embodiment, there exists one or more instances of the execution platform 316 used for executing client tasks, such as database queries and/or "internal" database tasks such as updating metadata, clustering a table, generating a materialized view, and so forth. In such an embodiment, there may also exist one or more instances of the execution platform 316 used for incremental feature development and/or testing, and each such instance of the execution platform 316 may be separate from each client instance of the execution platform 316, such that client processing is not impacted by feature-development tasks. The execution platform 316 may be coupled to multiple data-storage devices such as one or more of a data-storage device 512, a data-storage device 514, and a data-storage device 516 that are part of a storage platform 510. Although three data-storage devices are shown in FIG. 5, the execution platform 316 may be capable of communicating with any number of data-storage devices. In some embodiments, one or more of the data-storage device 512, the data-storage device 514, and the data-storage device 516 are cloud-based storage devices located in one or more geographic locations.

For example, one or more of the data-storage device 512, the data-storage device 514, and the data-storage device 516 may be part of a public cloud infrastructure or a private cloud infrastructure. One or more of the data-storage device 512, the data-storage device 514, and the data-storage device 516 may be or include hard disk drives (HDDs), solid state drives (SSDs), storage clusters or any other data-storage technology. Additionally, the storage platform 510 may include distributed file systems (such as Hadoop Distributed File Systems (HDFSs)), object storage systems, and the like.

In particular embodiments, any one or more of the communication links depicted in FIG. 5 could be implemented via one or more data-communication networks, which may utilize any communication protocol and any type of communication medium. In some embodiments, the data-communication networks are a combination of two or more data-communication networks (or sub-networks) coupled to one another. In alternative embodiments, these communication links are implemented using any type of communication medium and any communication protocol.

As shown in FIG. 5, the data-storage device 512, the data-storage device 514, and the data-storage device 516 are decoupled from the computing resources associated with the execution platform 316, the resource manager 302, and the database manager 502 generally. In an embodiment, each of a plurality of database deployments includes a respective storage platform 510 having its own respective multiple data-storage devices. This architecture supports dynamic changes to the data-processing platform 500 based on the changing data-storage/retrieval needs as well as changing needs of users and systems accessing the data-processing platform 500. The support of dynamic changes allows the data-processing platform 500 to scale quickly in response to changing demands on the systems and components within the data-processing platform 500. The decoupling of the computing resources from the data-storage devices supports the storage of large amounts of data without requiring a corresponding large amount of computing resources. Similarly, this decoupling of computing resources supports a significant increase in the computing resources utilized at a particular time without requiring a corresponding increase in the available data-storage resources.

The database manager 502, the resource manager 302, the metadata 518, the execution platform 316, and the storage platform 510 are shown in FIG. 5 as components. However, each of the resource manager 302, the metadata 518, the execution platform 316, and the storage platform 510 may be implemented as a distributed system (e.g., distributed across multiple systems/platforms at multiple geographic locations). Additionally, each of the database manager 502, the resource manager 302, the metadata 518, the execution platform 316, and the storage platform 510 can be scaled up or down (independently of one another) depending on changes to the requests received from users and the changing needs of the data-processing platform 500. Thus, the data-processing platform 500 is dynamic and supports regular changes to meet changing data-processing needs.

Figure 6:
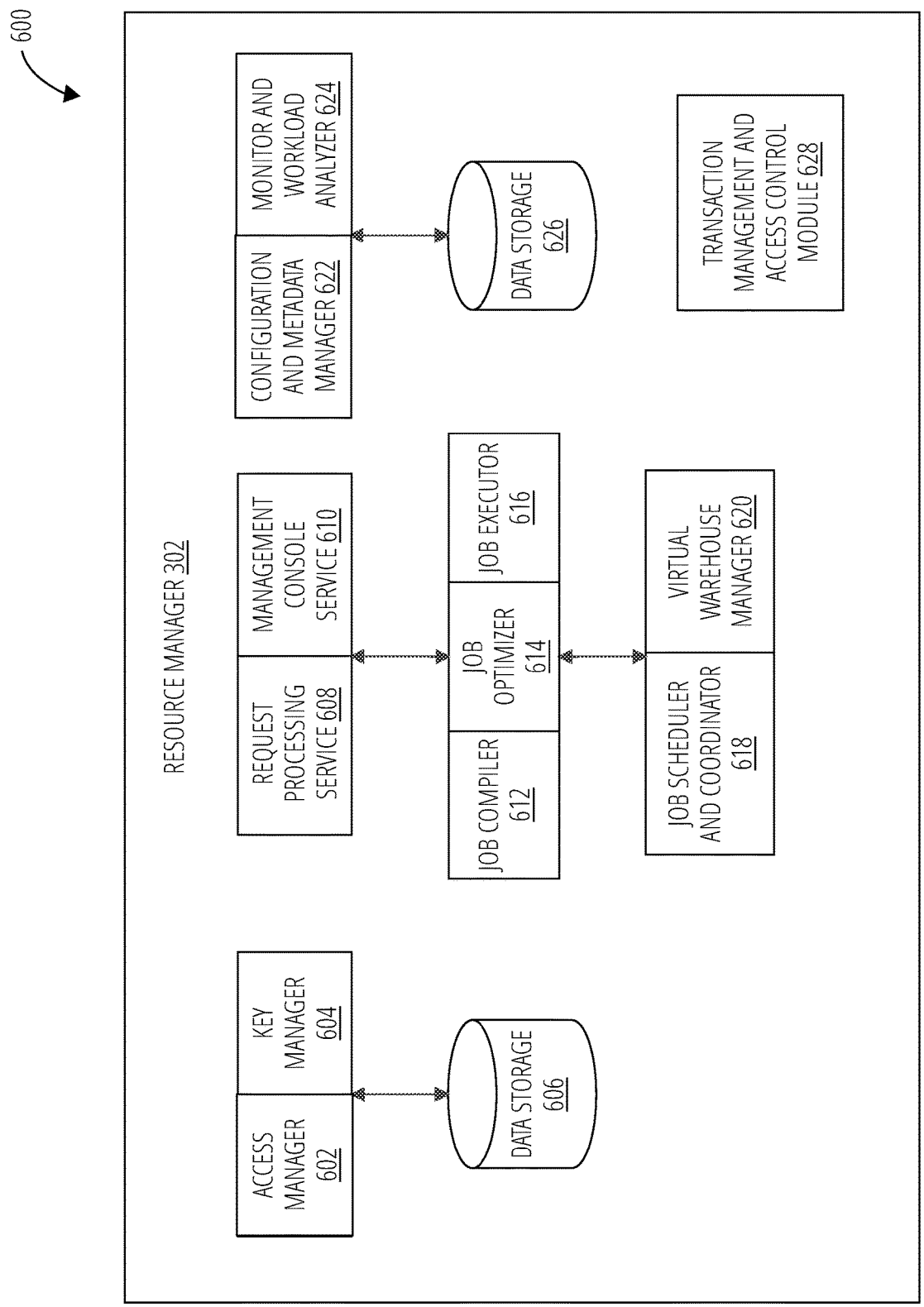
FIG. 6 illustrates an example resource-manager architecture, in accordance with at least one embodiment.

FIG. 6 illustrates an example resource-manager architecture 600, in accordance with at least one embodiment. As shown in FIG. 6, the resource manager 302 includes an access manager 602 and a key manager 604 coupled to a data storage 606. The access manager 602 handles authentication and authorization tasks for the systems described herein. The key manager 604 manages storage and authentication of keys used during authentication and authorization tasks. For example, the access manager 602 and the key manager 604 may manage the keys used to access data stored in remote storage devices (e.g., data-storage devices in storage platform 510). As used herein, the remote storage devices may also be referred to as "persistent storage devices" or "shared storage devices." A request processing service 608 manages received data-storage requests and data-retrieval requests (e.g., jobs to be performed on database data). For example, the request processing service 608 may determine the data necessary to process a given received data-storage request or data-retrieval request. The necessary data may be stored in a cache within the execution platform 316 (as discussed in greater detail herein) or in a data-storage device in the storage platform 510. A management console service 610 supports access to various systems and processes by administrators and other system managers. Additionally, the management console service 610 may receive a request to execute a job and monitor the workload on the system.

In the depicted embodiment, the resource manager 302 also includes a job compiler 612, a job optimizer 614, and a job executor 616. The job compiler 612 may parse a job into multiple discrete tasks and generate execution code for each of the multiple discrete tasks. The job optimizer 614 may select a method to execute the multiple discrete tasks based on the data to be processed. The job optimizer 614 may also handle various data-pruning operations and other data-optimization techniques to improve the speed and efficiency of executing the job. The job executor 616 may execute the execution code for received jobs (a received query) or as determined by the resource manager 302.

Furthermore, in the depicted embodiment, a job scheduler and coordinator 618 sends received jobs to the appropriate services or systems for compilation, optimization, and dispatch to the execution platform 316. For example, jobs may be prioritized and processed in that prioritized order. In an embodiment, the job scheduler and coordinator 618 determines a priority for internal jobs that are scheduled by the resource manager 302 with other "outside" jobs such as user queries that may be scheduled by other systems but that may utilize the same processing resources in the execution platform 316. In some embodiments, the job scheduler and coordinator 618 identifies or assigns particular nodes in the execution platform 316 to process particular tasks. A virtual warehouse manager 620 may manage the operation of multiple virtual warehouses implemented in the execution platform 316. As discussed below, in at least one embodiment, each virtual warehouse includes multiple execution nodes that each include a cache and a processor.

Additionally, in the depicted embodiment, the resource manager 302 includes a configuration and metadata manager 622, which may manage the information related to the data stored in the remote data-storage devices and in the local caches (i.e., caches in the execution platform 316). In some embodiments, the configuration and metadata manager 622 uses the metadata 518 to determine which data files need to be accessed to retrieve data for processing a particular task or job. A monitor and workload analyzer 624 may oversee processes performed by the resource manager 302 and manage the distribution of tasks (e.g., workload) across the virtual warehouses and execution nodes in the execution platform 316. The monitor and workload analyzer 624 may also redistribute tasks, as needed, based on changing workloads throughout the data-processing platform 500 and may further redistribute tasks based on a user (i.e., "external") query workload that may also be processed by the execution platform 316. The configuration and metadata manager 622 and the monitor and workload analyzer 624 are coupled to a data storage 626. Data storage 606 and data storage 626 in FIG. 6 can represent any data-storage device or devices within the data-processing platform 500. For example, the data storage 606 and the data storage 626 may represent caches in the execution platform 316, any of the data-storage device 512, the data-storage device 514, and/or the data-storage device 516 in the storage platform 510, and/or any other storage device.

In the depicted embodiment, the resource manager 302 also includes a transaction management and access control module 628, which may manage various tasks and other activities associated with the processing of data-storage requests and data-access requests. For example, the transaction management and access control module 628 may provide consistent and synchronized access to data by multiple users and/or systems. Since multiple users and/or systems may access the same data simultaneously, changes to the data must be synchronized to ensure that each user and/or system is working with the current version of the data. The transaction management and access control module 628 may provide control of various data-processing activities at a single, centralized location in the resource manager 302. In some embodiments, the transaction management and access control module 628 interacts with the job executor 616 to support the management of various tasks being executed by the job executor 616.

Figure 7:
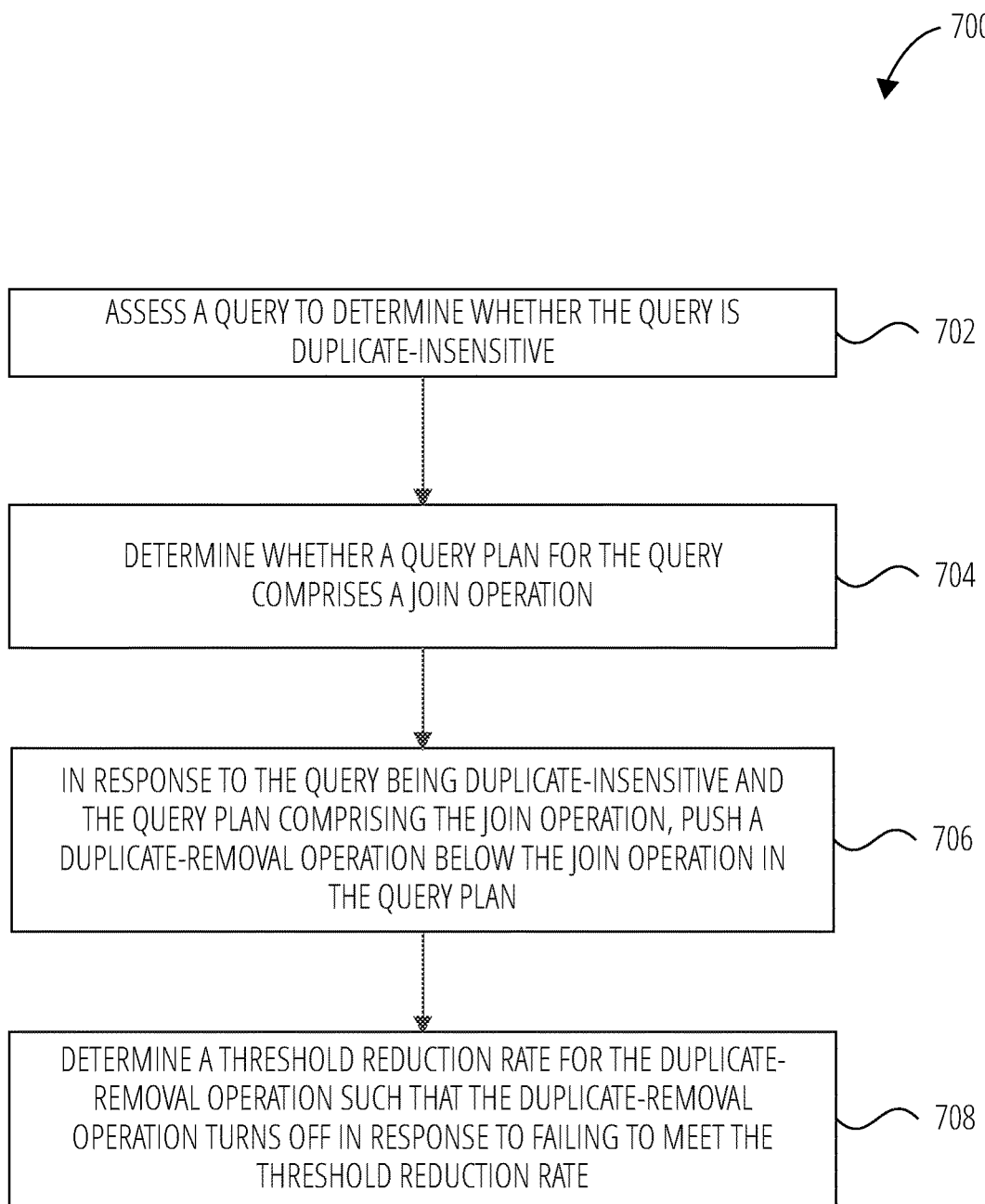
FIG. 7 illustrates an example method, in accordance with at least one embodiment.

FIG. 7 illustrates an example method 700, in accordance with at least one embodiment. The method 700 is a method of modifying a query. The method 700 may be performed by any suitable computing resource(s) (e.g., device(s)) such as the database manager 502, the resource manager 302, or the job optimizer 614, as examples.

The method 700 begins and a computing resource assesses at operation 702 a query to determine whether the query is duplicate-insensitive. The query is duplicate-insensitive if a result of the query is not dependent on how many duplicate values exist in the dataset and/or each instance of duplicate values in the dataset. An example query that is duplicate-insensitive includes a query function for determining minimum and maximum values in a dataset. The method 700 continues and a computing resource determines at operation 704 whether a query plan for the query includes a join operation. The method 700 continues and a computing resource, in response to the query being duplicate-insensitive and the query plan including a join operation, pushes at operation 706 a duplicate-removal operation (e.g., an adaptive aggregation operator) below the join operation in the query plan. The method 700 continues and a computing resource determines at operation 708 a threshold reduction rate for the duplicate-removal operation such that the duplicate-removal operation turns off in response to failing to meet the threshold reduction rate. The computing resource may determine the threshold reduction rate based on a user-defined parameter, based on SQL text for the query, based on parameters for query results, and/or the like.

Figure 8:
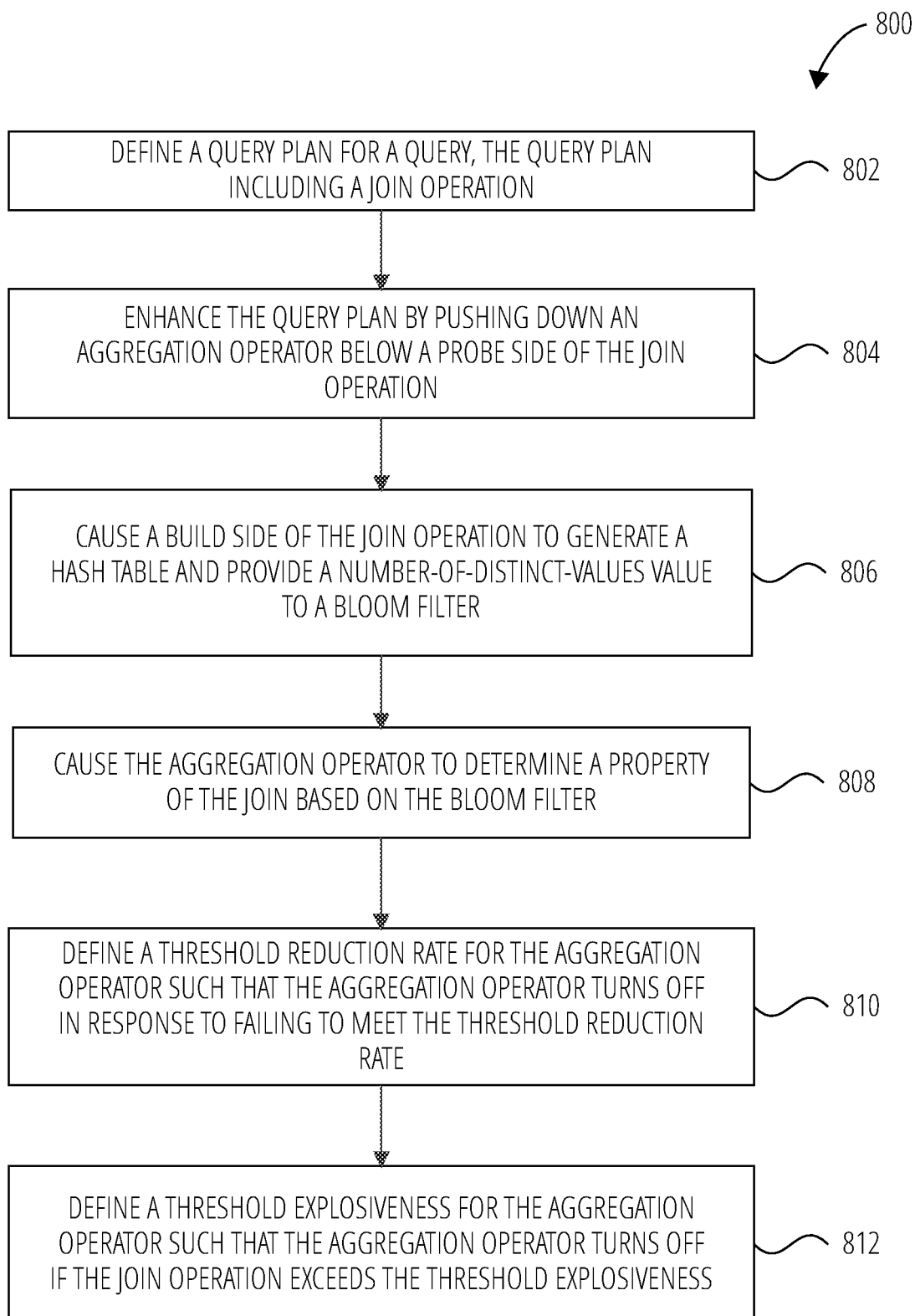
FIG. 8 illustrates an example method, in accordance with at least one embodiment.

FIG. 8 illustrates an example method 800, in accordance with at least one embodiment. The method 800 is a method of enhancing a query. The method 800 may be performed by any suitable computing resource(s) (e.g., device(s)) such as the database manager 502, the resource manager 302, or the job optimizer 614, as examples.

The method 800 begins and a computing resource defines at operation 802 a query plan for a query, where the query plan includes a join operation. A computing resource enhances at operation 804 the query plan by pushing down an aggregation operator below a probe side of the join operation. A computing resource causes at operation 806 a build side of the join operation to generate a hash table and provide a number-of-distinct-values value to a bloom filter. A computing resource causes at operation 808 the aggregation operator to determine a property of the join operation based on the bloom filter. A computing resource defines at operation 810 a threshold reduction rate for the aggregation operator such that the aggregation operator turns off if it fails to meet the threshold reduction rate. A computing resource defines at operation 812 a threshold explosiveness for the aggregation operator such that the aggregation operator turns off if the join operation exceeds the threshold explosiveness.

Figure 9:
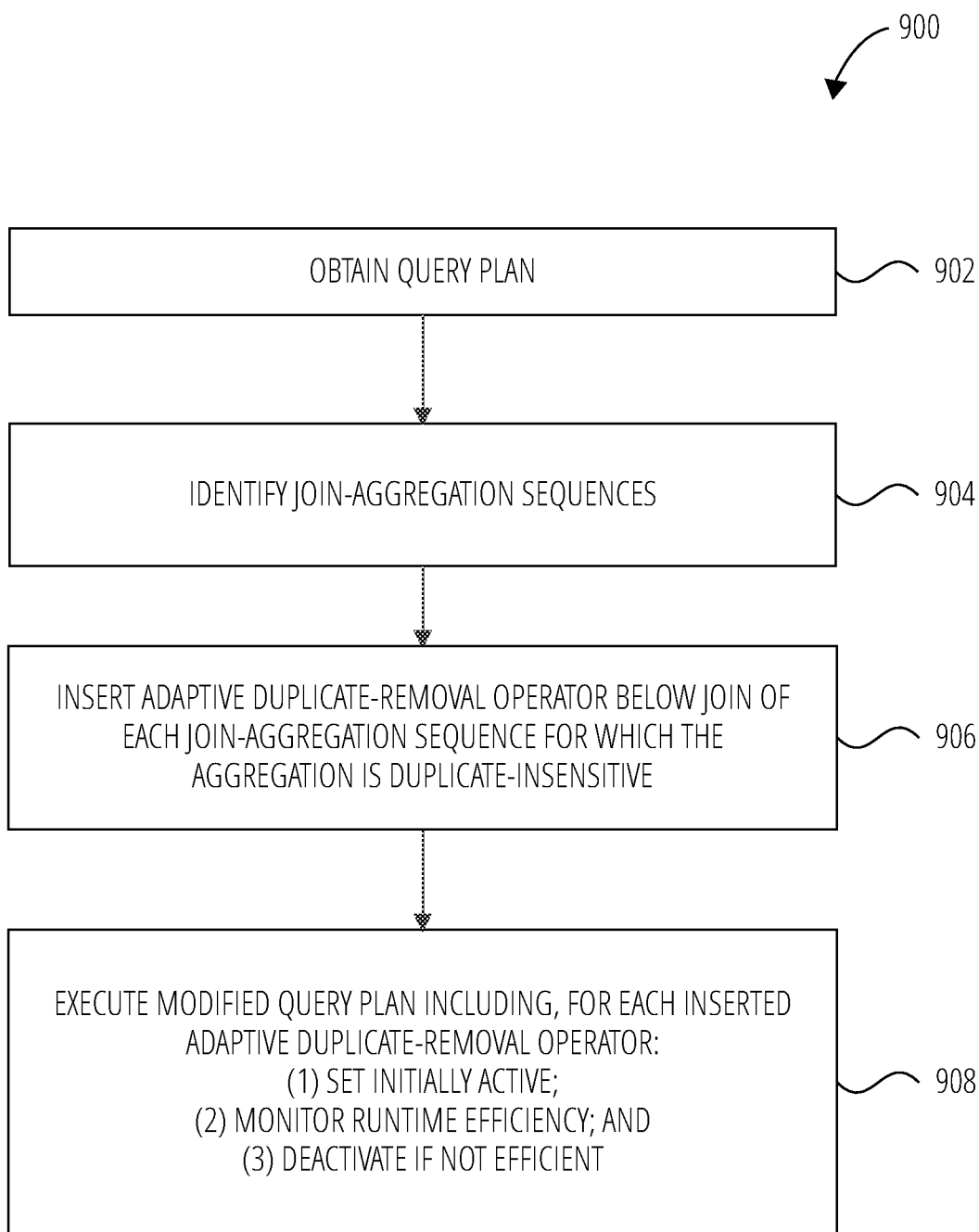
FIG. 9 illustrates an example method, in accordance with at least one embodiment.

FIG. 9 illustrates an example method 900, in accordance with at least one embodiment. The method 900 is a method of adaptively enhancing a query plan. In various different embodiments, the method 900 could be performed by any computing and communication device or system of such devices that is suitably equipped, programmed, and configured to perform the operations described herein. By way of example and not limitation, the method 900 is described below as being performed by the database manager 502, which may involve one or more aspects of the method 900 being performed by the resource manager 302, one or more aspects of the method 900 being performed by the execution platform 316, and/or one or more aspects of the method 900 being performed by one or more other functional components of the database manager 502.

Prior to delving into the specifically described operations of the method 900, it is noted that, in some embodiments, the method 900 involves "sprinkling" one or more of what are referred to herein as adaptive aggregation (AD) operators into a query plan. The sprinkling may involve inserting AT operators below joins that are below aggregation operators at one or more nodes (e.g., at every node) at which doing so is semantically permissible in that it preserves the semantics of the query. Once this sprinkling is complete, the (modified) query plan is executed with the sprinkled AT operators initially set to an active state (described below). In the case of each inserted AT operator, one or more of what are referred to herein as cost-efficiency metrics are monitored, and a given AT operator is shut off if the one or more monitored metrics indicate a threshold-inefficiency condition (e.g., are either above or below a given threshold, depending on the nature of the metric being monitored). In an example, a specialized type of AT operator is an adaptive try-deduplicate operator in which the difference is that a given try-deduplicate operator only performs distinct (deduplicate) operations, whereas an adaptive aggregation operator also performs the aggregation.

Thus, AT operators are inserted where permissible, activated, and then selectively deactivated if they are not helping (e.g., not helping enough). As noted above, a traditional query optimizer can "guess wrong" when it comes to aggregation placement, so embodiments of the present disclosure remove the guesswork and do not rely on the query optimizer to make a final "perfect" plan: AT operators are inserted and then selectively kept active or deactivated with the goal of improving the overall efficiency of the processing of the related query. As such, embodiments of the present disclosure involve pushing down (e.g., inserting) AT operators and/or other aggregations where the runtime adaptiveness of embodiments of the present disclosure remove or at least greatly reduce risk of overall performance degradation. As part of this runtime-adaptive strategy, it is recognized as discussed below and elsewhere herein that the data being processed does not need to be totally duplicate-free for the reduction to be effective. In other words, partial deduplication is still better than nothing, and in fact quite helpful.

Figure 10:
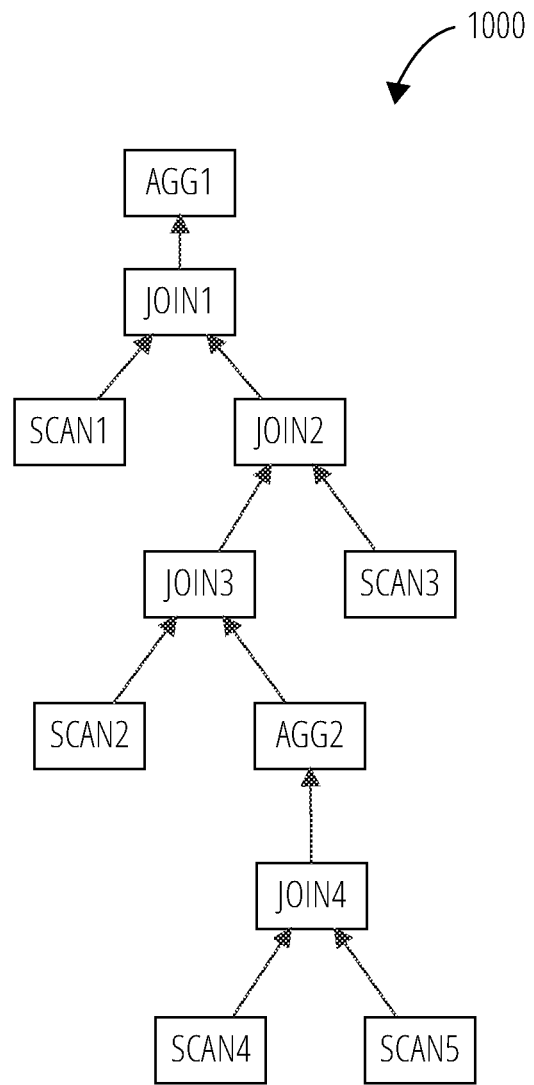
FIG. 10 illustrates an example query plan, in accordance with at least one embodiment.

With respect to the method 900, at operation 902, the database manager 502 obtains a query plan that corresponds to a query. In an embodiment, this may involve receiving the query, generating a parsed query at least in part by parsing the query, and compiling the query plan based at least in part on the parsed query. As an example of a query plan that the database manager 502 may obtain at operation 902, attention is directed to FIG. 10, which illustrates an example query plan 1000, in accordance with at least one embodiment.

Starting from the top down, the query plan 1000 ends with an aggregation that is denoted "AGG1". Prior to AGG1 is a join that is denoted "JOIN1". The left input to JOIN1 is a first table T1 that is denoted by the function SCAN1. The right input to JOIN1 is a second join that is labeled "JOIN2". The left input of JOIN2 is a third join that is labeled "JOIN3", while the right input is the data from a table T3, denoted "SCAN3". The left input of JOIN3 is the data of a table T2, denoted "SCAN2", and the right input to JOIN3 is the output of a second aggregation, which is denoted "AGG2". The input to AGG2 is a fourth join, denoted "JOIN4", for which the left and right inputs are the data from tables T4 and T5, denoted "SCAN4" and "SCAN5", respectively.

Returning to FIG. 9, at operation 904, the database manager 502 identifies one or more join-aggregation sequences in the query plan 1000, where each identified join-aggregation sequence includes a join operator positioned below an aggregation operator. In the query plan 1000, there are two join-aggregation sequences: JOIN1→AGG1 and JOIN4→AGG2. In both of those, the respective join is positioned immediately below the corresponding aggregation in the query plan 1000. However, it could also be the case that a multiple-join-aggregation sequence was identified in which a series of multiple joins is positioned below a given aggregation. Such an example would be JOIN3→JOIN2→JOIN1→AGG1. For simplicity, the join-aggregation sequences JOIN1→AGG1 and JOIN4→AGG2 are discussed herein.

At operation 906, the database manager 502 generates a modified query plan at least in part by, for each join-aggregation sequence identified at operation 904, determining whether the aggregation operator in the join-aggregation sequence is a duplicate-insensitive aggregation operator, and if so then inserting an adaptive duplicate-removal operator (e.g., an AT operator) below at least one input of the corresponding join operator. Examples of duplicate-insensitive aggregation operators include a find-maximum-value aggregation operator, a find-minimum-value aggregation operator, and a find-number-of-distinct-values aggregation operator. Other examples could be listed here as well. As discussed above, the single-join-aggregation sequences JOIN1→AGG1 and JOIN4→AGG2 are discussed here by way of example, but in some embodiments the operation 906 involves inserting an adaptive duplicate-removal operator below a series of multiple joins that precede an aggregation in a query plan.

In performing the operation 906, the database manager 502 may make a top-down assessment at each node of the query plan 1000 to identify the semantically permissible aggregation operators that could be inserted at each such node, such that the overall semantics of the query plan are preserved. In some embodiments, such assessments of semantic permissibility are made above a given join of a given join-aggregation sequence, and that determined property is then essentially pushed below the given join as at least part of determining a list of semantically permissible aggregation operators for insertion below the given join. As described herein, an adaptive duplicate-removal operator (e.g., an AT operator) is treated in embodiments of this disclosure as a special case of an aggregation operator in that it does not produce a singular result (e.g., an identified maximum value).

Figure 11:
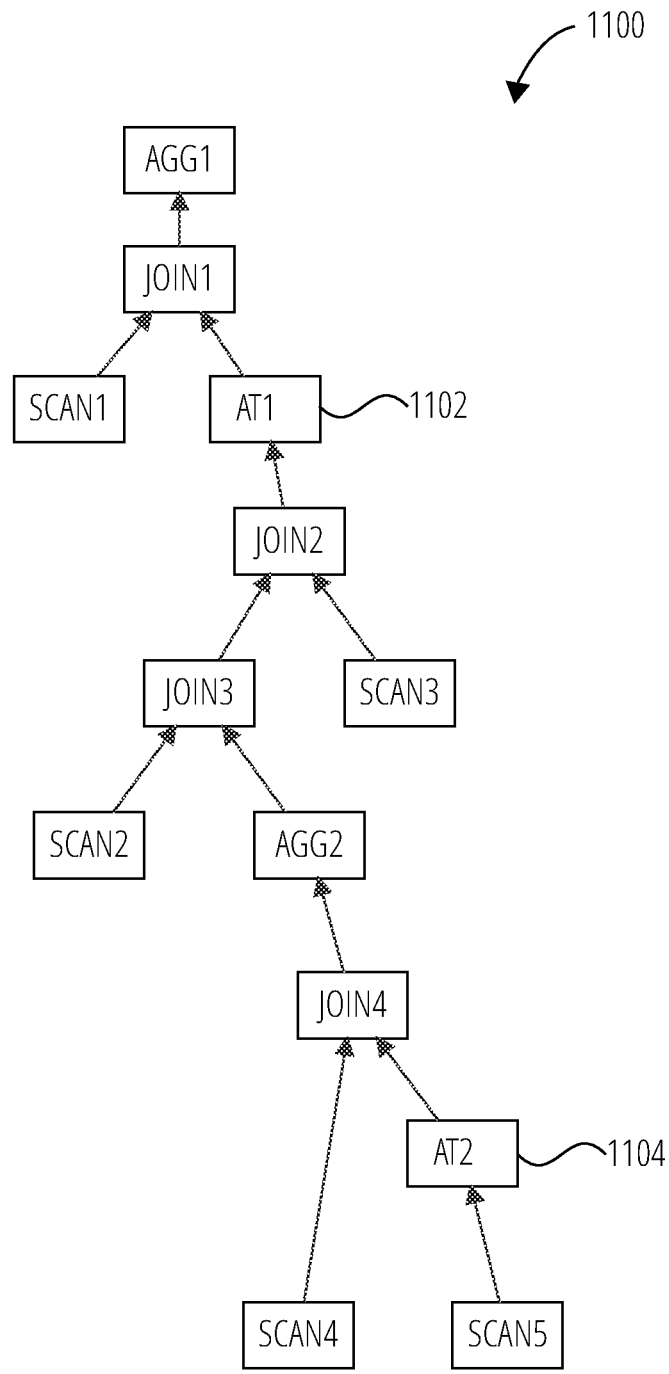
FIG. 11 illustrates an example enhanced query plan, in accordance with at least one embodiment.

Following the performing of the operation 906, the database manager 502 may have generated a modified (e.g., enhanced) query plan such as the example modified query plan 1100 that is depicted in FIG. 11. As can be seen in FIG. 11, two AT operators have been inserted into what was the query plan 1000 to arrive at the modified query plan 1100: an AT1 1102 and an AT2 1104. In the depicted embodiment, both the AT1 1102 and the AT2 1104 have been inserted below the right side of JOIN1 and JOIN4, respectively. In other embodiments, one or both of the AT1 1102 and the AT2 1104 could be inserted below the left side of a respective join. In some embodiments, in the case of either or both of JOIN1 and JOIN4, an AT could be inserted below both sides. Moreover, although not explicitly depicted in FIG. 11, either or both of JOIN1 and JOIN4 could include respective build sides and probe sides.

Returning to FIG. 9 and continuing with the method 900, at operation 908, the database manager 502 executes the modified query plan 1100 to obtain a query result, where executing the modified query plan 1100 includes for each inserted adaptive duplicate-removal operator (i.e., for each of the AT1 1102 and the AT2 1104): (i) initially operating with the inserted adaptive duplicate-removal operator active; (ii) monitoring at least one runtime cost-efficiency metric of at least one of the inserted adaptive duplicate-removal operator and the corresponding join operator; and (iii) deactivating the inserted adaptive duplicate-removal operator if the at least one monitored runtime cost-efficiency metric indicates a threshold-inefficiency condition.

Some example characteristics of the AT1 1102 are now described with the understanding that these characteristics could apply with equal force to the AT2 1104 as well or instead, and/or generally to any inserted adaptive duplicate-removal operator according to the present disclosure. In at least one embodiment, when active, the AT1 1102 operates to remove at least some records having duplicative values for at least one duplicate-removal-operator key. In some embodiments, the AT1 1102 uses a Bloom filter or other similar mechanism to track observed key values.

It is noted that, in some instances, if the keys of the related join (e.g., JOIN1) are different from the duplicate-removal-operator key(s) of the AT1 1102, the AT1 1102 may be adjusted to use the set union of the join keys and its own keys. In general, the duplicate-removal-operator key of the AT1 1102 is the attribute (e.g., column) in which the AT1 1102 is looking for duplicates and removing rows based on such duplication. In many instances, the duplicate-removal-operator key of the AT1 1102 is the same as the join key at least for the side of the join under which the 1102 has been inserted. In some cases, the duplicate-removal-operator key matches an aggregation key of the aggregation (e.g., AGG1) that is positioned above the join (e.g., JOIN1) below which the inserted AT1 1102 is positioned. Thus, if AGG1 was seeking a minimum of a column C1 and a max of a column C2, C1 and C2 may be set as the duplicate-removal-operator keys of the AT1 1102.

As stated, in some embodiments, when active, the operation of the AT1 1102 is bounded by a memory budget. Thus, the AT1 1102 may ingest rows up to its memory budget, look for and remove records having duplicates of its keys and, as described more fully below, switch itself off (e.g., into a passthrough mode) if it is not causing at least a threshold reduction in the number of rows being output to the right input of JOIN1. Bounding the operation of AT1 1102 with a memory budget reduces the likelihood of a performance regression caused by the inserted duplicate-removal operation. In at least one embodiment, the AT1 1102 will only use main memory of the worker (e.g., thread, execution node, and/or the like) in which it has been instantiated. In such embodiments, the AT1 1102 does not spill any data (to, e.g., local disk or remote storage). As a result of this property in such embodiments, the AT1 1102 does not guarantee to always fully deduplicate its input stream of records with respect to its duplicate-removal-operator key(s), which may also be referred to as its deduplication key(s). Instead, in at least some embodiments, the AT1 1102 simply tries to deduplicate input records up to its configured memory capacity.

With respect to deactivation, in at least some embodiments, deactivating the AT1 1102 includes placing the AT1 1102 in a passthrough mode in which records are not evaluated for being duplicative of other records. Thus, in some embodiments, the AT1 1102 observes its own input and output records, and switches to passthrough mode if it detects that it is not sufficiently (e.g., threshold) efficient and/or beneficial.

As stated above, in at least one embodiment, the AT1 1102 deactivates if the at least one monitored runtime cost-efficiency metric indicates a threshold-inefficiency condition. As one example of the at least one monitored runtime cost-efficiency metric indicating a threshold-inefficiency condition, the at least one monitored runtime cost-efficiency metric could be less than a corresponding threshold. For example, the at least one monitored runtime cost-efficiency metric could be or include a reduction rate, and the monitored runtime cost-efficiency metric indicating a threshold-inefficiency condition could include the monitored reduction rate being less than a reduction-rate threshold.

As another example of the at least one monitored runtime cost-efficiency metric indicating a threshold-inefficiency condition, the at least one monitored runtime cost-efficiency metric could be greater than a corresponding threshold. For example, the at least one monitored runtime cost-efficiency metric could be or include an explosion factor of a join operator, and the monitored runtime cost-efficiency metric indicating a threshold-inefficiency condition could include the monitored explosion factor being greater than an explosion-factor threshold.

In an example, an explosion factor of the join is defined with respect to one of its inputs (e.g., build side or probe side). Thus, the explosion factor, in this example, is defined as the number of observed output rows of the join divided by the number of input rows from either side of the join. In some embodiments, once the modified query plan 1100 has been fully processed, the database manager 502 outputs an obtained query result to the requesting entity (e.g., user). Such an output could take the form of or include saving a materialized view, displaying a report, transmitting a result data set to a requesting entity, and/or the like.

Figure 12:
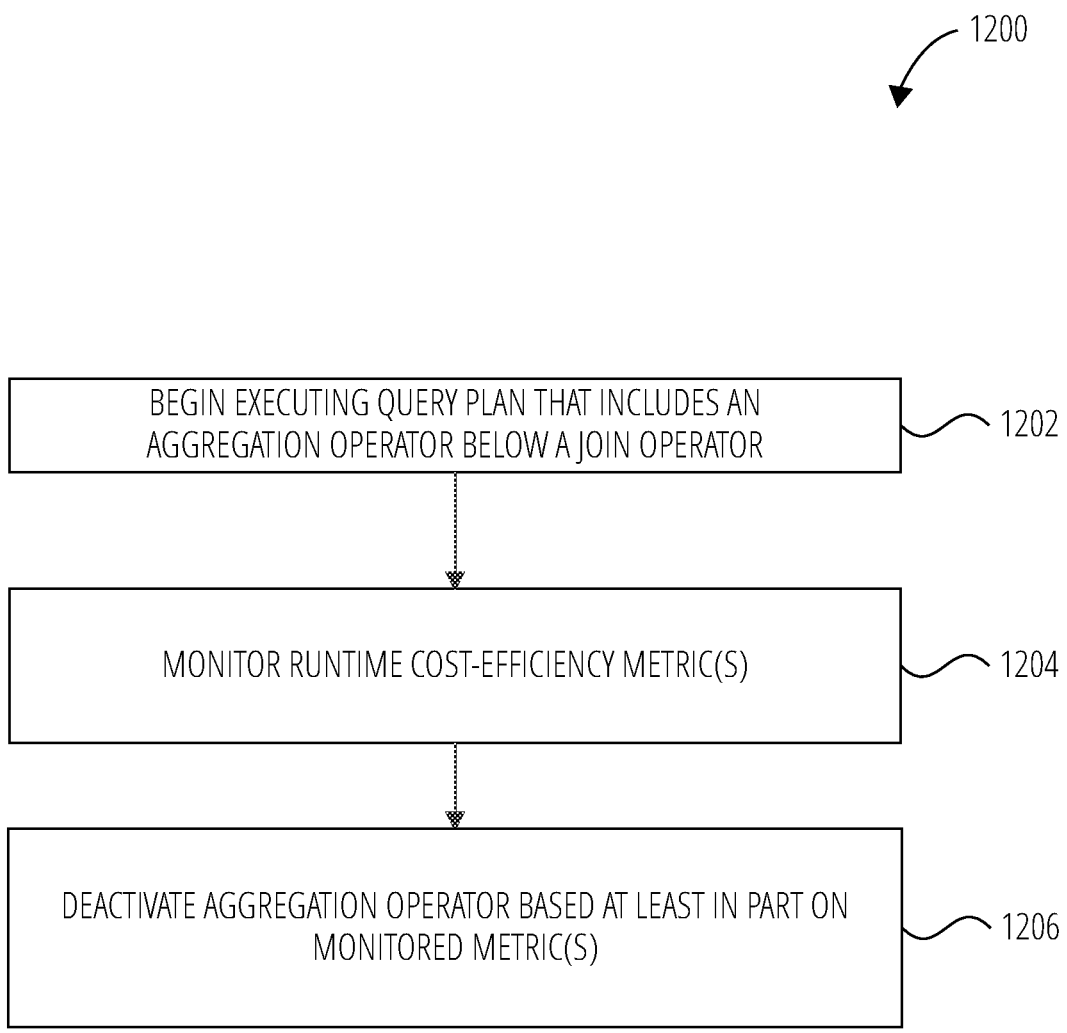
FIG. 12 illustrates an example method, in accordance with at least one embodiment.

FIG. 12 illustrates an example method 1200, in accordance with at least one embodiment. The method 1200 is a method of conditionally continuing execution of a portion of a query plan. In various different embodiments, the method 1200 could be performed by any computing and communication device or system of such devices that is suitably equipped, programmed, and configured to perform the operations described herein. By way of example and not limitation, the method 1200 is described below as being performed by the database manager 502, which may involve one or more aspects of the method 1200 being performed by the resource manager 302, one or more aspects of the method 1200 being performed by the execution platform 316, and/or one or more aspects of the method 1200 being performed by one or more other functional components of the database manager 502.

The method 1200 of FIG. 12 is similar in some ways to the method 900 of FIG. 9, and thus is not described in as great of detail. One similarity is that, in at least some embodiments, both methods involve monitoring one or more runtime cost-efficiency metrics of a given aggregation operator that is positioned below a join operator in a query plan. One difference is that the below-join aggregation operator that is monitored in the method 1200 is not necessarily an adaptive duplicate-removal operator as is the case in the described embodiments of the method 900. Both the method 900 and the method 1200 involve selectively shutting off a below-join aggregation operator based on one or more monitored cost-efficiency metrics. Further similarities and differences between the method 900 and the method 1200 will be evident from the balance of this description of FIG. 12.

Figure 13:
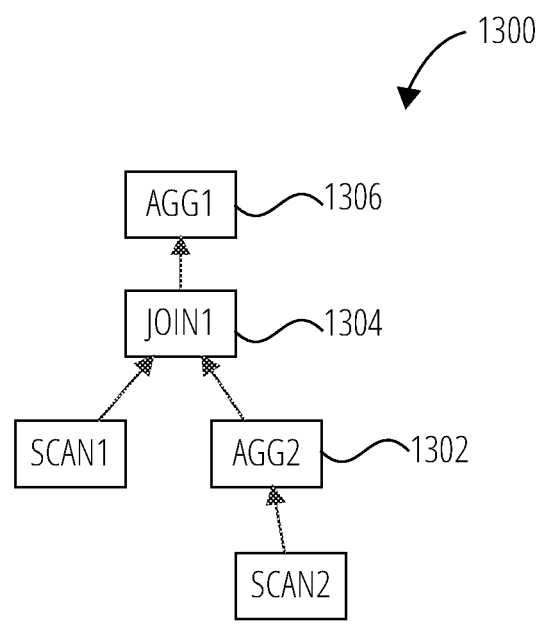
FIG. 13 illustrates an example query plan, in accordance with one embodiment.

Turning now to the method 1200, at operation 1202, the database manager 502 executes a query plan that corresponds to a query, where the query plan includes an aggregation operator positioned below a join operator. As an example, the query plan that is being executed in connection with the described embodiments of the method 1200 could be the example query plan 1300 that is depicted in FIG. 13. In the 1300, starting from the top down and working left to right, the query plan 1300 ends with an aggregation that is denoted AGG1 1306, which receives an output from a join that denoted JOIN1 1304. The left input of JOIN1 1304 is the data of an input table T1, denoted SCAN1, while the right input of JOIN1 1304 is the output of an aggregation that is denoted AGG2 1302. The input of AGG2 1302 is the data of an input table T2, denoted SCAN2.

As stated above, the query plan 1300 is associated with a query. In an embodiment, the database manager 502 receives the query and generates the query plan 1300 from the received query. In at least one such embodiment, the database manager 502 first generates an initial query plan (not shown) that does not include the aggregation operator AGG2 1302 and later inserts AGG2 1302 into that initial query plan to generate the query plan 1300. Other sequences of generating the query plan 1300 could be used as well in various different embodiments.

As shown in FIG. 13, the in addition to the AGG2 1302, the query plan 1300 also includes the AGG1 1306, which is positioned above JOIN1 1304. In at least one embodiment, the AGG2 1302 and the AGG1 1306 are of a same aggregation-operator type (e.g., sum, average, standard deviation, etc.) as one another. Regardless of the type of aggregation that AGG2 1302 is, in various different embodiments, the AGG1 1306 could be either a duplicate-insensitive aggregation operator or a duplicate-sensitive aggregation operator.

Returning now to FIG. 12, while executing the query plan 1300, the database manager 502 monitors (at operation 1204) at least one runtime cost-efficiency metric of the executing query plan 1300. In at least one embodiment, the at least one monitored runtime cost-efficiency metric includes a reduction rate of AGG2 1302. The at least one monitored runtime cost-efficiency metric could also or instead include an explosion factor of JOIN1 1304. Another option that the at least one monitored runtime cost-efficiency metric could include is an execution time of the query plan 1300; that is, in some embodiments, the database manager 502 may consider the overall execution time in determining whether to keep AGG2 1302 in an active state or deactivate it. In an embodiment, the database manager 502 may do so at least in part by comparing the overall execution time (thus far during execution) to an expected time, an average time, and/or the like. Moreover, the method 1200 certainly applies to query plans that are more complex than the query plan 1300, as that plan is offered by way of simple example and not by way of limitation.

At operation 1206, also while executing the query plan 1300, the database manager 502 deactivates AGG2 1302 based at least in part on the at least one runtime cost-efficiency metric that is monitored (e.g., being monitored) at operation 1204. In at least one embodiment, deactivating AGG2 1302 includes placing AGG2 1302 in a passthrough mode in which ingested records are simply output without being analyzed or otherwise processed into a given aggregation function.

In an embodiment, the database manager 502 performs operation 1206 in response to the at least one monitored runtime cost-efficiency metric indicating a threshold-inefficiency condition. As examples, a given runtime cost-efficiency metric in the at least one runtime cost-efficiency metric could be greater than or less than a given threshold, depending on the type of metric. As examples, a threshold-inefficiency condition could involve a reduction rate being less than a reduction-rate threshold and/or an explosion factor being greater than an explosion-factor threshold.

In some embodiments, once the query plan 1300 has been fully processed, the database manager 502 obtains a query result to the query from executing the query plan 1300, and outputs the obtained query result to the requesting entity (e.g., user). Such an output could take the form of or include saving a materialized view, displaying a report, transmitting a result data set to a requesting entity, and/or the like.

Figure 14:
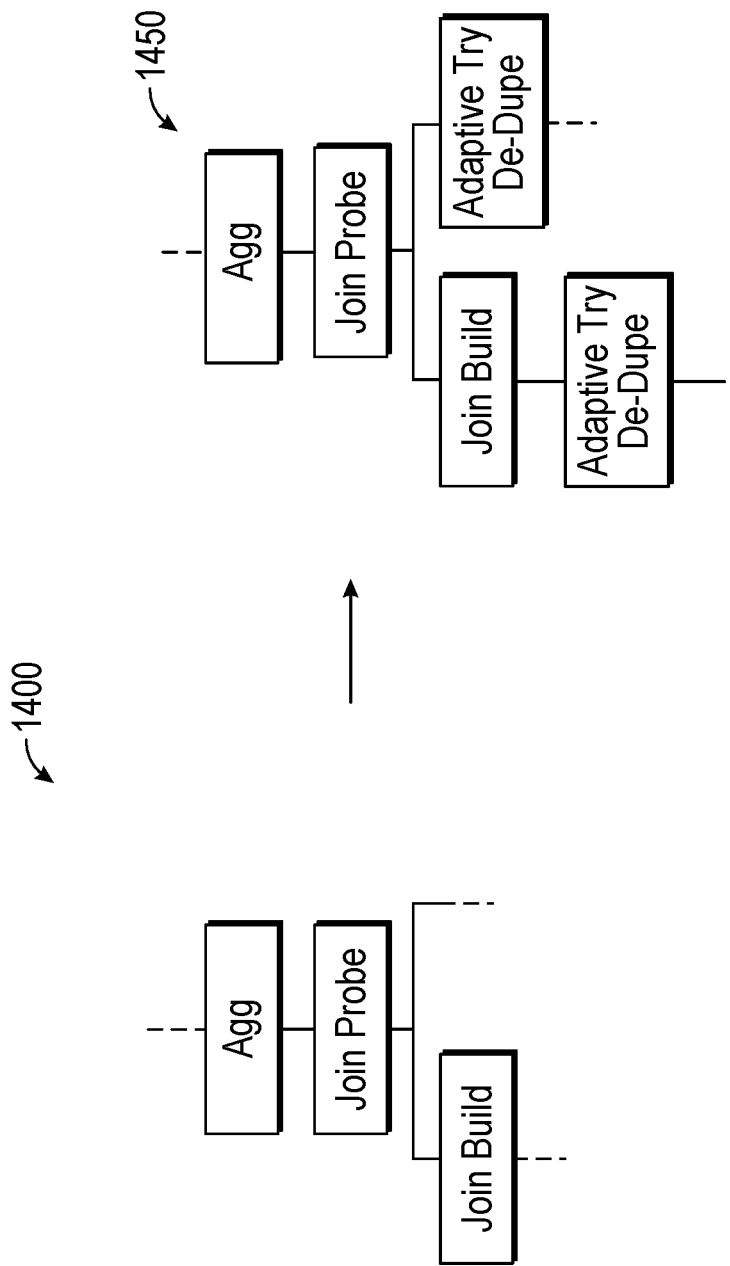
FIG. 14 is a schematic diagram of a try-deduplication optimization for a query execution plan in accordance with some embodiments of the subject technology.

FIG. 14 is a schematic diagram of a try-deduplication optimization for a query execution plan in accordance with some embodiments of the subject technology. FIG. 14 illustrates the try-deduplication query optimization technique. A graph 1400 on the left-hand side illustrates the original query execution plan fragment with an aggregation operation above a join operation. A graph 1450 on the right-hand side illustrates the query execution plan after pushing try-deduplication operations beneath the join operations on both sides of the plan. Note that this is only possible when the aggregation functions (denoted FL and FR in FIG. 10) are duplicate agnostic. This optimization is also optional in that the try-deduplication operations can be pushed to either side, and do not need to always push down to both sides of the join operation. The graph 1450 on the right-hand side also illustrates where the distinct keys in the try-deduplication operations come from. In an embodiment, these keys may need to be combined with join keys if the join keys are different from the distinct keys. This optimization is local, and the parallel workers and threads do not need to communicate between each other.

The try-deduplication operation is an operator with bounded amount of space usage. This means the try-deduplication operation will only use main memory and will not spill data to a local disk or to remote storage. As a result, the try-deduplication operator does not guarantee to always deduplicate by computing distinct values of input records. Instead, the try-deduplication operator attempts to deduplicate input records up to a configured memory capacity. The try-deduplication operator may observe its own input and output records and switch to pass-through mode if the try-deduplication operator detects that it is not reductive enough.

Figure 15:
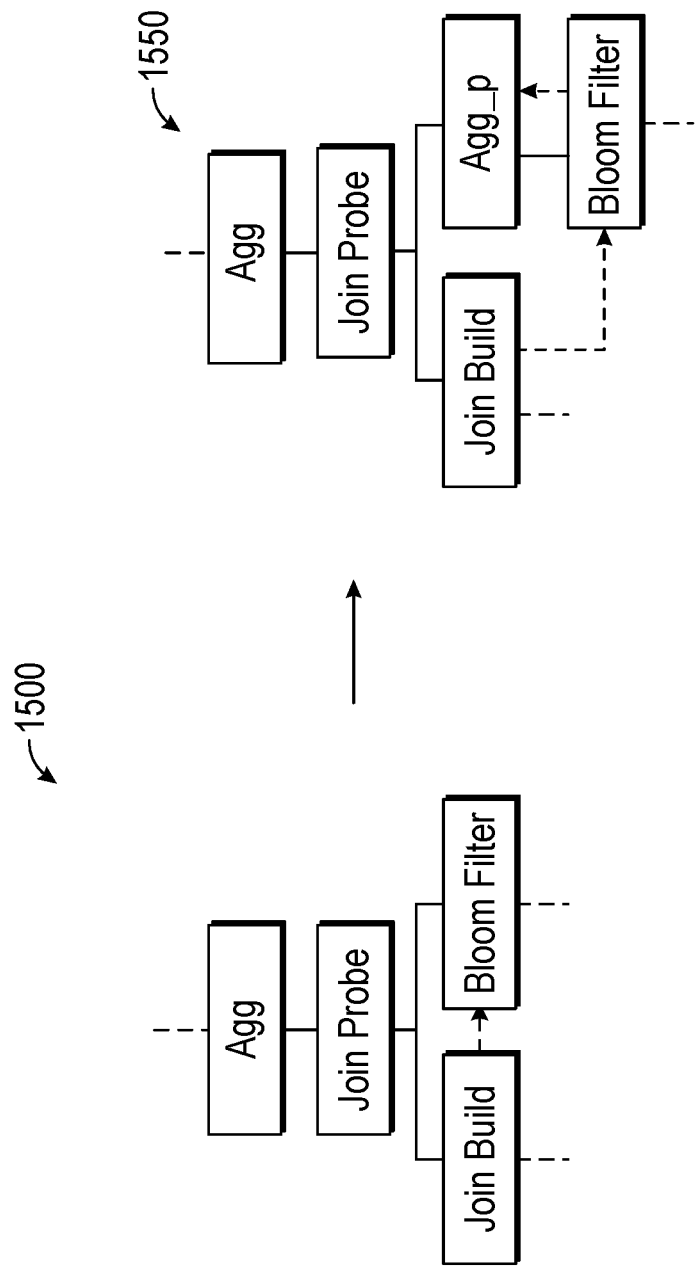
FIG. 15 is a schematic diagram of a local generalized optimization of a query execution plan in accordance with some embodiments of the subject technology.

FIG. 15 is a schematic diagram of a local generalized optimization of a query execution plan in accordance with some embodiments of the subject technology. Compared with the try-deduplication optimization illustrated in FIG. 14, the local generalized optimization is general and can be applied to any aggregation function. The local generalized optimization is local to each thread executing the query in parallel and does not require global communication. The left-hand side illustrates a graph 1500 including an aggregation on top of a join, with a bloom filter beneath the join probe. After the transformation, as shown in a graph 1550, an adaptive aggregation operator is pushed below the probe side of the join, with a bloom filter below the join. The first dotted line illustrates that the join build operator constructs the bloom filter as part of the build process, and along with the bloom filter, passes along information of the build side, including the build side join key cardinality and number of distinct values. The second dotted line illustrates the additional information passed from bloom filter to pushed-down aggregation. Here, the bloom filter passes along the information it receives from the build side along with the selectivity of the bloom filter itself to the pushed-down aggregation. In an embodiment, this is evaluated by combining the aggregation operation with the building of the hash table for the join build operator. In an embodiment, this optimization is orthogonal of other steps and can be applied independently. The diagram in FIG. 15 further illustrates the local decision-making process in the pushed-down aggregation. As shown, a pushed-down aggregation "Agg_p" takes into account the information received from the build side of the join as a proxy of the explosiveness of the join and further looks at the observed reduction rate to determine whether there is a benefit to continuing evaluation of the aggregation or to switch to pass-through mode.

The local generalized optimization enables numerous advantages. One advantage is the aggregation pushdown is adaptive and avoids performance regressions when compared to a non-optimized query plan. A further advantage is the local generalized optimization is simple and less prone to errors because the optimization techniques are performed locally within a small thread. A further advantage is the local generalized optimizer is general and applies to all types of aggregation functions.

Figure 16:
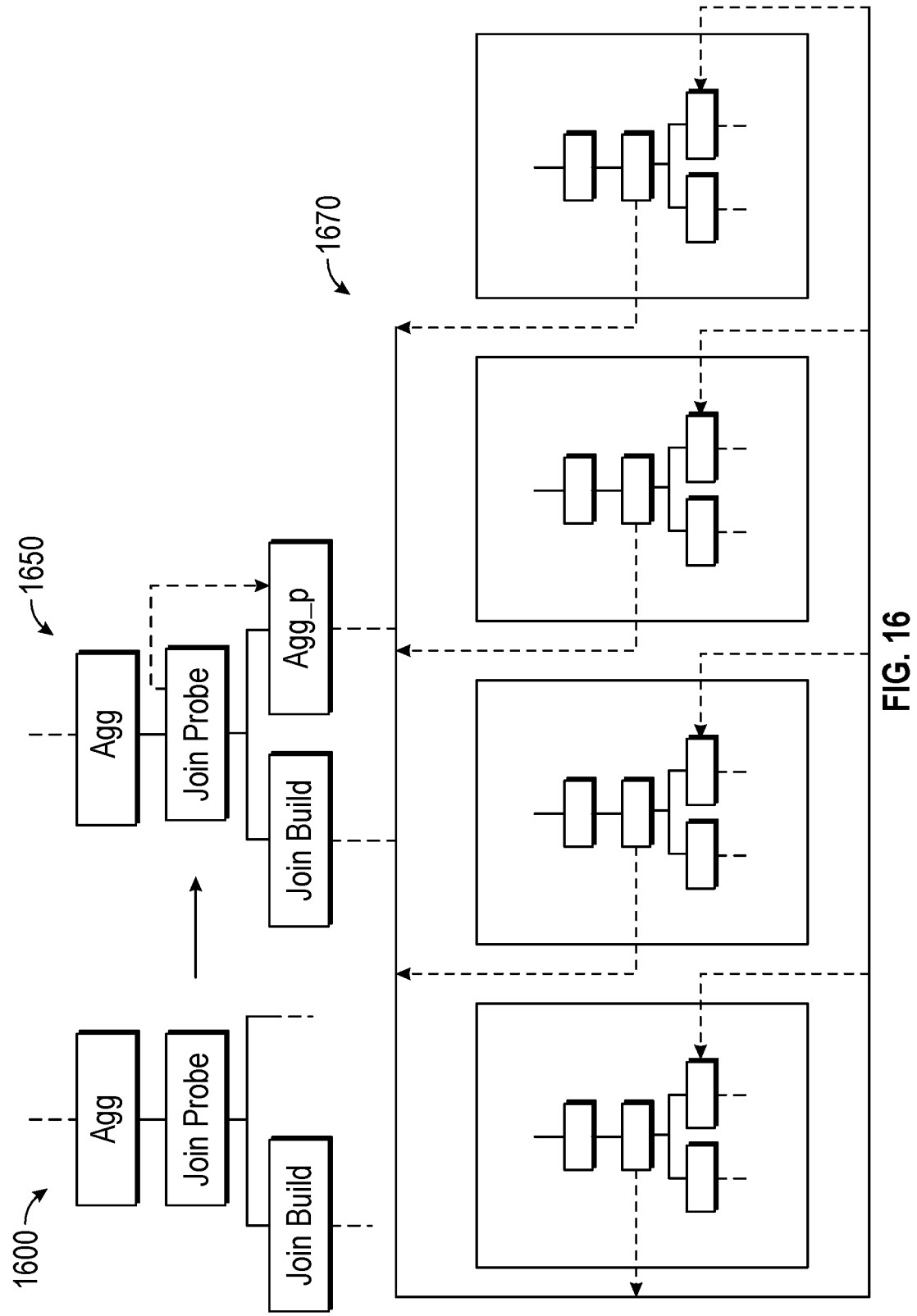
FIG. 16 is a schematic diagram of a global generalized optimization for a query execution plan in accordance with some embodiments of the subject technology.

FIG. 16 is a schematic diagram of a global generalized optimization for a query execution plan in accordance with some embodiments of the subject technology. The global generalized optimization is a robust and accurate optimization with a tradeoff that requires global communication across threads and nodes that are executing the query. A graph 1600 on the top of FIG. 16, corresponds to a transformation represented by a graph 1650, has the same shape as the plan described with respect to FIG. 15. The first dotted line in the graph 1650 represents a feedback of information from after the join probe back to the pushed down aggregation below. In the beginning, a pushed-down aggregation may be switched off, and after observing the join information, the pushed-down aggregation may be switched back on. The pushed-down aggregation may be switched back on if it is believed the join is explosive enough. After evaluating the pushed-down aggregation for a period of time, the pushed-down aggregation operation can be turned back off if the reduction ratio does not satisfy a threshold.

A graph 1670 in the bottom of FIG. 16 illustrates how the feedback process works when there are multiple threads and servers executing the plan in parallel. Information such as join cardinality, explosiveness, and skews from the join probe operator of each work is broadcast to all workers through a global communication message channel. The aggregation operation of each worker receives the global information, assesses the global information with observed local information, and makes a determination whether to switch to pass-through mode at a local level.

The global generalized optimization is accurate because the exact properties of the join probe are observed and assessed at execution time. Additionally, the optimization has the global information so that skews in the join operation can be detected. In an embodiment, this means the pushed-down aggregation has a greater chance at making the correct decision to turn on or off.

Figure 17:
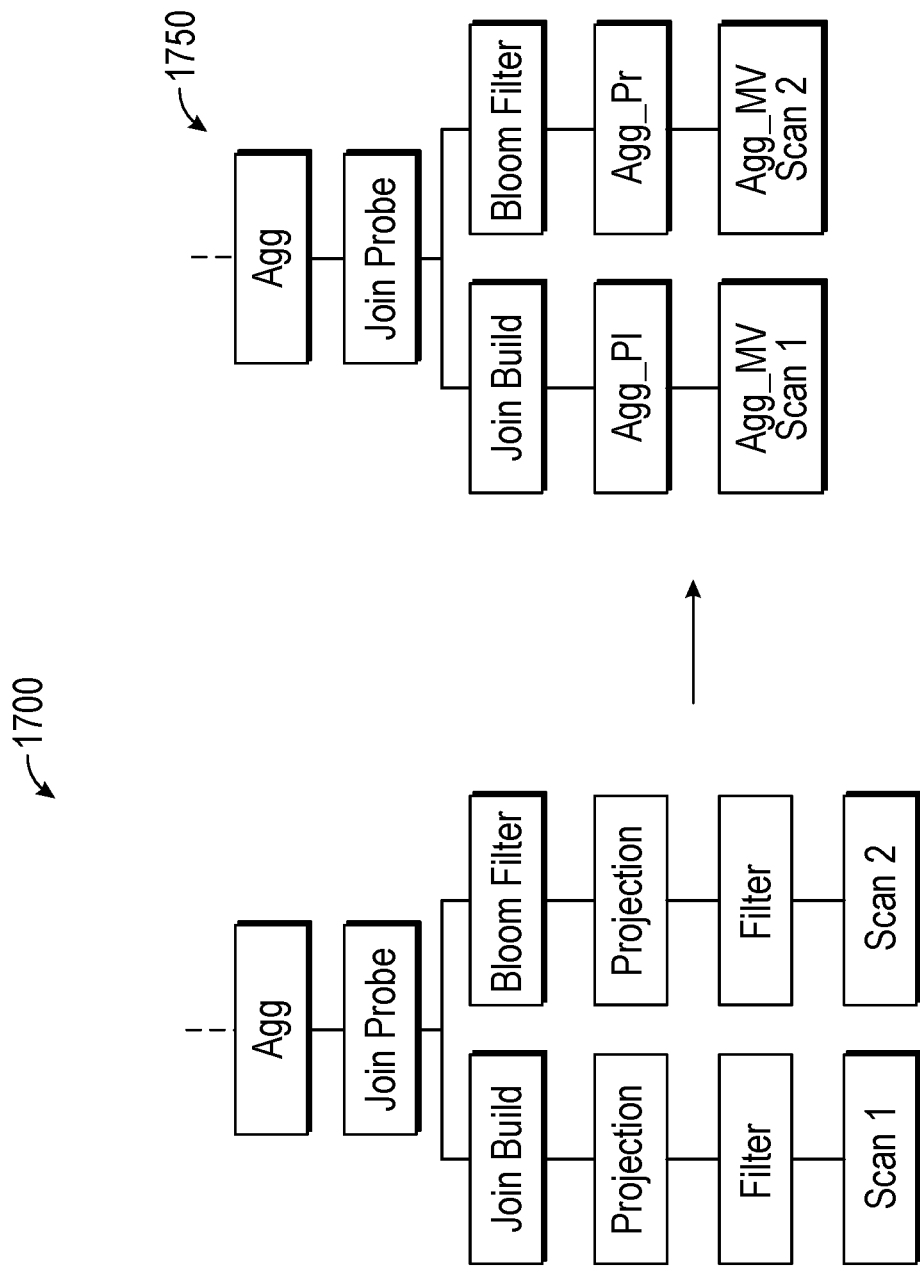
FIG. 17 is a schematic diagram of an aggregation materialized view (MV) rewrite optimization in accordance with some embodiments of the subject technology.

FIG. 17 is a schematic diagram of an aggregation materialized view (MV) rewrite optimization in accordance with some embodiments of the subject technology. A graph 1700 on the left-hand side of FIG. 17 illustrates the original plan with an aggregation operation on top of a join operation, wherein the join operation is directly on top of two tables. The aggregation MV rewrite optimization may apply when only one side of the join is a base table scan and the other side of the join may also be a join. A graph 1750 on the right-hand side of FIG. 17 illustrates the query execution plan after the transformations made by the aggregation MV rewrite optimization. In an embodiment, assuming aggregation MVs are created on the base tables, and that the aggregation key in the MV is a superset of the pushed-down aggregation, the query plan can be rewritten beneath the joins on either side to query over the MV. In an embodiment, there will still be a compensation aggregation on top of the MV scan even when the MV itself includes the aggregation.

The aggregation MV rewrite optimization enables numerous advantages. One advantage is that the optimization can take advantage of MVs to speed up query processing, and particularly where the aggregation is reductive, and the table scan is expensive. Another advantage is that by pushing down the aggregation below the join, the MVs can be utilized and incrementally maintained. This ensures a good query performance without having to incur expensive MV maintenance costs.

Figure 18:
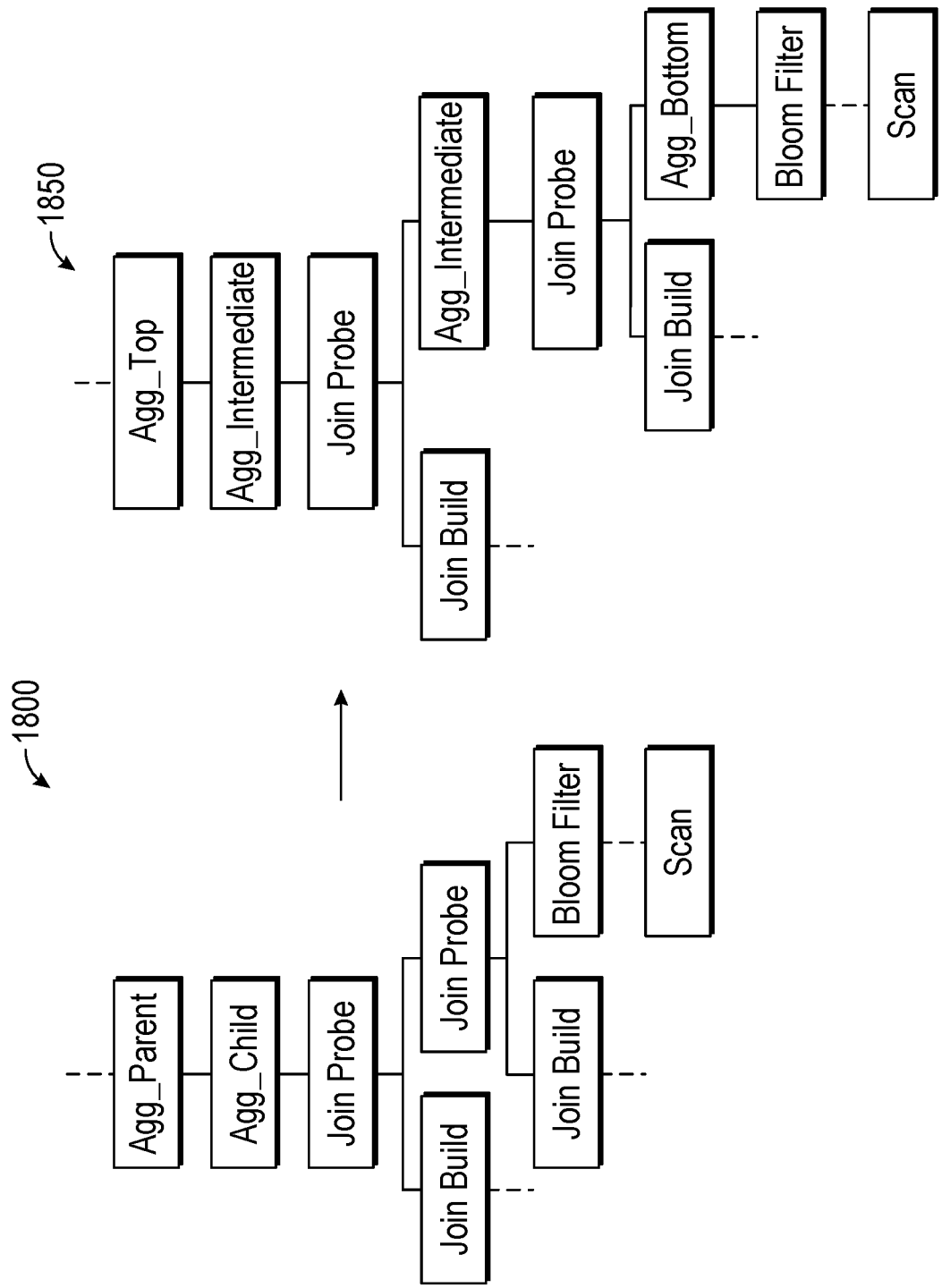
FIG. 18 is a schematic diagram of an aggregation framework extension for a query execution plan in accordance with some embodiments of the subject technology.

FIG. 18 is a schematic diagram of an aggregation framework extension for a query execution plan in accordance with some embodiments of the subject technology. A query execution plan, shown in a graph 1800, uses an existing aggregation framework that typically includes at most two aggregations, including the parent aggregation and the child aggregation. The child aggregation is evaluated on each thread and/or node. The parent aggregation uses the result of each child aggregation and performs a final global aggregation operation. Typically, the parent aggregation appears immediately on top of the child aggregation in the query plan tree, and this is not flexible. In the query plan, corresponding to a graph 1800, the parent aggregation and the child aggregation are denoted as A_parent and A_child. The datatype of the input to the child aggregation is denoted as T_input and the datatype of the output is denoted as T_intermediate, and the output as type T_output.

The aggregation framework extension breaks an aggregation into three distinct parts rather than the traditional two parts. The aggregation framework extension as illustrated in a graph 1850 includes a top aggregation, an intermediate aggregation, and a bottom aggregation. The top aggregation is denoted as A_top, the intermediate aggregation is denoted as A_intermediate, and the bottom aggregation is denoted as A_bottom. The parent aggregation remains the same as the original parent aggregation. However, an intermediate aggregation type is introduced that applies locally without communication. The aggregations do not need to be next each other in the query plan and can be pushed through joins. Both A_intermediate and A_bottom are applied locally only. The intermediate aggregation and the child aggregation also have different adaptive mechanisms than the parent. The A_bottom has input type T_input and output type T_intermediate. The A_intermediate has both input and output types as T_intermediate. The A_top has input T_intermediate and output type T_output. Any arbitrary aggregation functions can be split this way, so the framework is more flexible and powerful.

FIG. 19 illustrates an example computing device 1900, in accordance with at least one embodiment. In some embodiments, the computing device 1900 is used to implement one or more of the systems and components discussed herein. For example, the computing device 1900 may allow a user or administrator to access the resource manager 302. Further, the computing device 1900 may interact with any of the systems and components described herein. Accordingly, the computing device 1900 may be used to perform various procedures and tasks, such as those discussed herein. The computing device 1900 can function as a server, a client, or any other computing entity. The computing device 1900 can be any of a wide variety of computing devices, such as a desktop computer, a notebook computer, a server computer, a handheld computer, a mobile device, a tablet, and/or the like.

In the depicted embodiment, the computing device 1900 includes one or more processor(s) 1902, one or more memory device(s) 1904, one or more interface(s) 1906, one or more mass storage device(s) 1908, and one or more input/output device(s) 1910, all of which are coupled to a bus 1912. The processor(s) 1902 include one or more processors or controllers that execute instructions stored in the memory device(s) 1904 and/or the mass storage device(s) 1908. The processor(s) 1902 may also include various types of computer-readable media, such as cache memory.

The memory device(s) 1904 can include various computer-readable media, such as volatile memory (e.g., random access memory (RAM)) and/or nonvolatile memory (e.g., read-only memory (ROM)). The memory device(s) 1904 may also include rewritable ROM, such as Flash memory.

The interface(s) 1906 may include various interfaces that allow the computing device 1900 to interact with other systems, devices, or computing environments. Example interface(s) 1906 include any number of different network interfaces, such as interfaces to local area networks (LANs), wide area networks (WANs), wireless networks, the Internet, and/or the like.

The mass storage device(s) 1908 may include various computer readable media, such as magnetic tapes, magnetic disks, optical disks, solid state memory (e.g., Flash memory), and so forth. Various drives may also be included in the mass storage device(s) 1908 to enable reading from and/or writing to the various computer readable media. The mass storage device(s) 1908 may include removable media and/or non-removable media.

The input/output device(s) 1910 may include various devices that allow data and/or other information to be input to and/or retrieved from the computing device 1900. Example input/output device(s) 1910 include cursor-control devices, keyboards, keypads, microphones, monitors or other display devices, speakers, printers, network interface cards, modems, lenses, CCDs or other image capture devices, and the like.

The bus 1912 allows the processor(s) 1902, the memory device(s) 1904, the interface(s) 1906, the mass storage device(s) 1908, and the input/output device(s) 1910 to communicate with one another, as well as with other devices or components that may be coupled to the bus 1912. The bus 1912 represents one or more of several types of bus structures, such as a system bus, PCI bus, IEEE 1394 bus, USB bus, and/or the like.

Executable Instructions and Machine Storage Medium

The various memories may store one or more sets of instructions 1914 and data structures (e.g., software) embodying or utilized by any one or more of the methodologies or functions described herein. These instructions 1914, when executed by the processor(s) 1902, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, any network or portion network described herein may include a wireless or cellular network, and a utilized coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1914 may be transmitted or received over a network using a transmission medium via a network interface device (e.g., a network interface component) and utilizing any one of a number of well-known transfer protocols (e.g., hypertext transfer protocol (HTTP)). Similarly, the instructions 1914 may be transmitted or received using a transmission medium via a coupling (e.g., a peer-to-peer coupling) to one or more devices. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1914 for execution by the computing device 1900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

As stated above, the terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

For purposes of illustration, programs and other executable program components are shown herein as discrete blocks, although it is understood that such programs and components may reside at various times in different storage components of the computing device 1900 and are executed by the processor(s) 1902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Examples of Embodiments

Following is a list of some examples of embodiments of systems and methods for adaptively enhancing query plans.

Example 1 is a method comprising: receiving a query plan, the query plan comprising a set of query operations, the set of query operations including at least one aggregation and a join operation, the join operation including a build side and a probe side; inserting an aggregation operator below the probe side of the join operation; causing the build side of the join operation to generate a hash table; causing the build side of the join operation to generate a bloom filter based at least in part on the hash table and provide information, corresponding to properties of the build side, to a bloom filter; and based at least in part on the information, determining at least one property of the join operation to determine whether to switch the aggregation operator to a pass through mode.

Example 2 includes the subject matter of Example 1 wherein optionally the build side of the join operation provides information comprising a build side join key cardinality and a number of distinct values of a join key.

Example 3 includes the subject matter of any one of Examples 1 and 2, wherein determining the at least one property of the join operation optionally comprises: causing the aggregation operator to determine an explosiveness of the join operation based on the information from the build side of the join operation.

Example 4 includes the subject matter of any one of Examples 1-3, wherein optionally the explosiveness of the join operation is based at least in part on a number of distinct values of a join key as indicated by the bloom filter.

Example 5 includes the subject matter of any one of Examples 1-4, further optionally comprising defining a threshold explosiveness for the aggregation operator such that the aggregation operator turns off at runtime in response to the join operation exceeding the threshold explosiveness.

Example 6 includes the subject matter of any one of Examples 1-5, further optionally comprising: causing the aggregation operator to determine a locally observed reduction rate of the aggregation operator.

Example 7 includes the subject matter of any one of Examples 1-6, further optionally comprising: defining a threshold reduction rate for the aggregation operator such that the aggregation operator turns off at runtime in response to failing to meet the threshold reduction rate for removing duplicate values in the probe side of the join operation.

Example 8 includes the subject matter of any one of Examples 1-7, further optionally comprising: inserting multiple aggregation operators within the query plan, wherein each of the multiple aggregation operators is configured to automatically turn off at runtime in response to determining an explosiveness of the join operation exceeds a threshold explosiveness or fails to meet a threshold reduction rate for removing duplicate values.

Example 9 is a system comprising: at least one processor; and a memory device including instructions, which when executed by the at least one processor, cause the at least one processor to perform operations comprising: receiving a query plan, the query plan comprising a set of query operations, the set of query operations including at least one aggregation and a join operation, the join operation including a build side and a probe side; inserting an aggregation operator below the probe side of the join operation; causing the build side of the join operation to generate a hash table; causing the build side of the join operation to generate a bloom filter based at least in part on the hash table and provide information, corresponding to properties of the build side, to a bloom filter; and based at least in part on the information, determining at least one property of the join operation to determine whether to switch the aggregation operator to a pass through mode.

Example 10 includes the subject matter of Example 9, wherein optionally the build side of the join operation provides information comprising a build side join key cardinality and a number of distinct values of a join key.

Example 11 includes the subject matter of any one of Examples 9-10, wherein determining the at least one property of the join operation further causes the at least one processor to perform operations further optionally comprising: causing the aggregation operator to determine an explosiveness of the join operation based on the information from the build side of the join operation.

Example 12 includes the subject matter of any one of Examples 9-11, wherein optionally the explosiveness of the join operation is based at least in part on a number of distinct values of a join key as indicated by the bloom filter.

Example 13 includes the subject matter of any one of Examples 9-12, wherein the memory device includes further instructions, which when executed by the at least one processor, further cause the at least one processor to perform operations optionally comprising: defining a threshold explosiveness for the aggregation operator such that the aggregation operator turns off at runtime in response to the join operation exceeding the threshold explosiveness.

Example 14 includes the subject matter of any one of Examples 9-13, wherein the memory device includes further instructions, which when executed by the at least one processor, further cause the at least one processor to perform operations optionally comprising: causing the aggregation operator to determine a locally observed reduction rate of the aggregation operator.

Example 15 includes the subject matter of any one of Examples 9-14, wherein the memory device includes further instructions, which when executed by the at least one processor, further cause the at least one processor to perform operations optionally comprising: defining a threshold reduction rate for the aggregation operator such that the aggregation operator turns off at runtime in response to failing to meet the threshold reduction rate for removing duplicate values in the probe side of the join operation.

Example 16 includes the subject matter of any one of 9-15, wherein the memory device includes further instructions, which when executed by the at least one processor, further cause the at least one processor to perform operations optionally comprising: inserting multiple aggregation operators within the query plan, wherein each of the multiple aggregation operators is configured to automatically turn off at runtime in response to determining an explosiveness of the join operation exceeds a threshold explosiveness or fails to meet a threshold reduction rate for removing duplicate values.

Example 17 is a non-transitory computer-storage medium comprising instructions that, when executed by at least one processor, configure the at least one processor to perform operations comprising: receiving a query plan, the query plan comprising a set of query operations, the set of query operations including at least one aggregation and a join operation, the join operation including a build side and a probe side; inserting an aggregation operator below the probe side of the join operation; causing the build side of the join operation to generate a hash table; causing the build side of the join operation to generate a bloom filter based at least in part on the hash table and provide information, corresponding to properties of the build side, to a bloom filter; and based at least in part on the information, determining at least one property of the join operation to determine whether to switch the aggregation operator to a pass through mode.

Example 18 includes the subject matter of Example 17, wherein optionally the build side of the join operation provides information comprising a build side join key cardinality and a number of distinct values of a join key.

Example 19 includes the subject matter of any one of Examples 17-18, wherein determining the at least one property of the join operation optionally comprises: causing the aggregation operator to determine an explosiveness of the join operation based on the information from the build side of the join operation.

Example 20 includes the subject matter of any one of Examples 17-19, wherein optionally the explosiveness of the join operation is based at least in part on a number of distinct values of a join key as indicated by the bloom filter.

Example 21 includes the subject matter of any one of Examples 17-20, wherein the operations further optionally comprise: defining a threshold explosiveness for the aggregation operator such that the aggregation operator turns off at runtime in response to the join operation exceeding the threshold explosiveness.

Example 22 includes the subject matter of any one of Examples 17-21, wherein the operations further optionally comprise: causing the aggregation operator to determine a locally observed reduction rate of the aggregation operator.

Example 23 includes the subject matter of any one of Examples 17-22, wherein the operations further optionally comprise: defining a threshold reduction rate for the aggregation operator such that the aggregation operator turns off at runtime in response to failing to meet the threshold reduction rate for removing duplicate values in the probe side of the join operation.

Example 24 includes the subject matter of any one of Examples 17-23, wherein the operations further optionally comprise: inserting multiple aggregation operators within the query plan, wherein each of the multiple aggregation operators is configured to automatically turn off at runtime in response to determining an explosiveness of the join operation exceeds a threshold explosiveness or fails to meet a threshold reduction rate for removing duplicate values.

CONCLUSION

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the term or phrase.

It is further noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

Many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays (FPGAs), programmable array logic, programmable logic devices, and/or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method comprising:
providing information, corresponding to properties of a build side of a join operation, to a bloom filter, the bloom filter utilized to pass the information to an aggregation operator;
based at least in part on the information from the bloom filter, determining, during executing of a query plan, at least one property of the join operation to determine whether to switch the aggregation operator to a pass through mode, the at least one property comprising at least a reduction rate, wherein the reduction rate is based on a ratio of a first number of records that a duplicate-removal operation has removed to a second number of records that the duplicate-removal operation has ingested;
switching, in response to the reduction rate being below a threshold value, the aggregation operator to the pass through mode during runtime of the query plan and, the switching facilitating a reduction in utilization of computing resources by forgoing performing the aggregation operator, each query operation in a set of query operations being included as different nodes in a tree structure corresponding to the query plan, the aggregation operator being in the pass through mode, the aggregation operator forgoing analyzing an input stream of data that goes through the aggregation operator and the input stream of data matching an output stream of data flowing out of the aggregation operator, the aggregation operator removing, when the reduction rate is above the threshold value of the reduction rate, database records having duplicative values for particular attributes based at least in part on a set of aggregation keys of the aggregation operator, and the aggregation operator forgoing the removing when in the pass through mode; and
after switching the aggregation operator to the pass through mode, sending new data received from the bloom filter to a second query operation included in the query plan, the new data being pass through the aggregation operator without performing the aggregation operator, the second query operation utilizing the new data to perform a particular operation of the query plan, the second query operation comprising a second aggregation operator different than the aggregation operator.

2. The method of claim 1, wherein the build side of the join operation providing information comprises a build side join key cardinality and a number of distinct values of a join key.

3. The method of claim 1, wherein determining the at least one property of the join operation comprises:

causing the aggregation operator to determine an explosiveness of the join operation based on the information from the build side of the join operation; and
defining a threshold explosiveness for the aggregation operator such that the aggregation operator turns off at runtime in response to the join operation exceeding the threshold explosiveness.

4. The method of claim 3, wherein the explosiveness of the join operation is based at least in part on a number of distinct values of a join key as indicated by the bloom filter.

5. The method of claim 1, further comprising:
inserting multiple aggregation operators within the query plan, wherein each of the multiple aggregation operators is configured to automatically turn off at runtime in response to determining an explosiveness of the join operation exceeds a threshold explosiveness or fails to meet the reduction rate for removing duplicate values.

6. A system comprising:
at least one processor; and
a memory device including instructions, which when executed by the at least one processor, cause the at least one processor to perform operations comprising:
providing information, corresponding to properties of a build side of a join operation, to a bloom filter, the bloom filter utilized to pass the information to an aggregation operator;
based at least in part on the information from the bloom filter, determining, during executing of a query plan, at least one property of the join operation to determine whether to switch the aggregation operator to a pass through mode, the at least one property comprising at least a reduction rate, wherein the reduction rate is based on a ratio of a first number of records that a duplicate-removal operation has removed to a second number of records that the duplicate-removal operation has ingested;
switching, in response to the reduction rate being below a threshold value, the aggregation operator to the pass through mode during runtime of the query plan and, the switching facilitating a reduction in utilization of computing resources by forgoing performing the aggregation operator, each query operation in a set of query operations being included as different nodes in a tree structure corresponding to the query plan, the aggregation operator being in the pass through mode, the aggregation operator forgoing analyzing an input stream of data that goes through the aggregation operator and the input stream of data matching an output stream of data flowing out of the aggregation operator, the aggregation operator removing, when the reduction rate is above the threshold value of the reduction rate, database records having duplicative values for particular attributes based at least in part on a set of aggregation keys of the aggregation operator, and the aggregation operator forgoing the removing when in the pass through mode; and
after switching the aggregation operator to the pass through mode, sending new data received from the bloom filter to a second query operation included in the query plan, the new data being pass through the aggregation operator without performing the aggregation operator, the second query operation utilizing the new data to perform a particular operation of the query plan, the second query operation comprising a second aggregation operator different than the aggregation operator.

7. The system of claim 6, wherein the build side of the join operation providing information comprises a build side join key cardinality and a number of distinct values of a join key.

8. The system of claim 6, wherein determining the at least one property of the join operation comprises:
- causing the aggregation operator to determine an explosiveness of the join operation based on the information from the build side of the join operation; and
- defining a threshold explosiveness for the aggregation operator such that the aggregation operator turns off at runtime in response to the join operation exceeding the threshold explosiveness.

9. The system of claim 8, wherein the explosiveness of the join operation is based at least in part on a number of distinct values of a join key as indicated by the bloom filter.

10. The system of claim 6, wherein the operations further comprise:
- inserting multiple aggregation operators within the query plan, wherein each of the multiple aggregation operators is configured to automatically turn off at runtime in response to determining an explosiveness of the join operation exceeds a threshold explosiveness or fails to meet the reduction rate for removing duplicate values.

11. A non-transitory computer-storage medium comprising instructions that, when executed by at least one processor, configure the at least one processor to perform operations comprising:
- providing information, corresponding to properties of a build side of a join operation, to a bloom filter, the bloom filter utilized to pass the information to an aggregation operator;
- based at least in part on the information from the bloom filter, determining, during executing of a query plan, at least one property of the join operation to determine whether to switch the aggregation operator to a pass through mode, the at least one property comprising at least a reduction rate, wherein the reduction rate is based on a ratio of a first number of records that a duplicate-removal operation has removed to a second number of records that the duplicate-removal operation has ingested;
- switching, in response to the reduction rate being below a threshold value, the aggregation operator to the pass through mode during runtime of the query plan and, the switching facilitating a reduction in utilization of computing resources by forgoing performing the aggregation operator, each query operation in a set of query operations being included as different nodes in a tree structure corresponding to the query plan, the aggregation operator being in the pass through mode, the aggregation operator forgoing analyzing an input stream of data that goes through the aggregation operator and the input stream of data matching an output stream of data flowing out of the aggregation operator, the aggregation operator removing, when the reduction rate is above the threshold value of the reduction rate, database records having duplicative values for particular attributes based at least in part on a set of aggregation keys of the aggregation operator, and the aggregation operator forgoing the removing when in the pass through mode; and
- after switching the aggregation operator to the pass through mode, sending new data received from the bloom filter to a second query operation included in the query plan, the new data being pass through the aggregation operator without performing the aggregation operator, the second query operation utilizing the new data to perform a particular operation of the query plan, the second query operation comprising a second aggregation operator different than the aggregation operator.

* * * * *